United States Patent
Willers et al.

(10) Patent No.: US 10,619,899 B2
(45) Date of Patent: Apr. 14, 2020

(54) MULTIWAY VALVE FOR CONTROLLING A REFRIGERANT CIRCUIT

(71) Applicant: OTTO EGELHOF GmbH & Co. KG, Fellbach (DE)

(72) Inventors: Eike Willers, Stuttgart (DE); Joan Aguilar, Remseck a.N. (DE); Rainer Maurer, Backnang (DE); Andreas Ehmen, Wilhelmshaven (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 168 days.

(21) Appl. No.: 15/893,883

(22) Filed: Feb. 12, 2018

(65) Prior Publication Data
US 2018/0231283 A1      Aug. 16, 2018

(30) Foreign Application Priority Data
Feb. 13, 2017   (DE) .................. 10 2017 102 841

(51) Int. Cl.
*F16K 11/074* (2006.01)
*F25B 41/04* (2006.01)
(Continued)

(52) U.S. Cl.
CPC .......... *F25B 41/046* (2013.01); *F16K 11/074* (2013.01); *F16K 11/0853* (2013.01);
(Continued)

(58) Field of Classification Search
CPC ...... F25B 41/003; F25B 41/04; F25B 41/046; F16K 11/074
See application file for complete search history.

(56) References Cited

U.S. PATENT DOCUMENTS

| 2,600,099 A | * | 6/1952 | Detrez | F15B 13/06 137/625.21 |
| 4,286,500 A | * | 9/1981 | Stevenson | F01B 29/08 137/625.21 |

(Continued)

FOREIGN PATENT DOCUMENTS

| DE | 101 53 710 A1 | 5/2003 |
| DE | 10 2011 118 162 A1 | 5/2013 |

(Continued)

*Primary Examiner* — Matthew W Jellett
*Assistant Examiner* — Christopher D Ballman
(74) *Attorney, Agent, or Firm* — Renner, Otto, Boisselle & Sklar, LLP

(57) ABSTRACT

A multiway valve for controlling a refrigerant circuit (12) of an air conditioning system with heat pump function has a housing (14), first inlet opening (21) connected by a first fluid channel (22) to a regulating chamber (19), a second connection opening (22) connected by a second fluid channel (26) to the regulating chamber (19), another connection opening (29, 33) connected by another fluid channel (30, 34) to the regulating chamber (19), an actuator (37) that actuates a transmission element (39) by a drive motor (38), which extends in the housing (14) between the drive motor (38) and the regulating chamber (19), and a rotary valve assembly (55) in the regulating chamber (19) and coupled to the transmission element (39) to be driven by a rotary motion, into consecutive and divergent switching or control positions between the inlet opening (21) and the connection openings (25, 29, 33).

21 Claims, 24 Drawing Sheets

Figure 1:
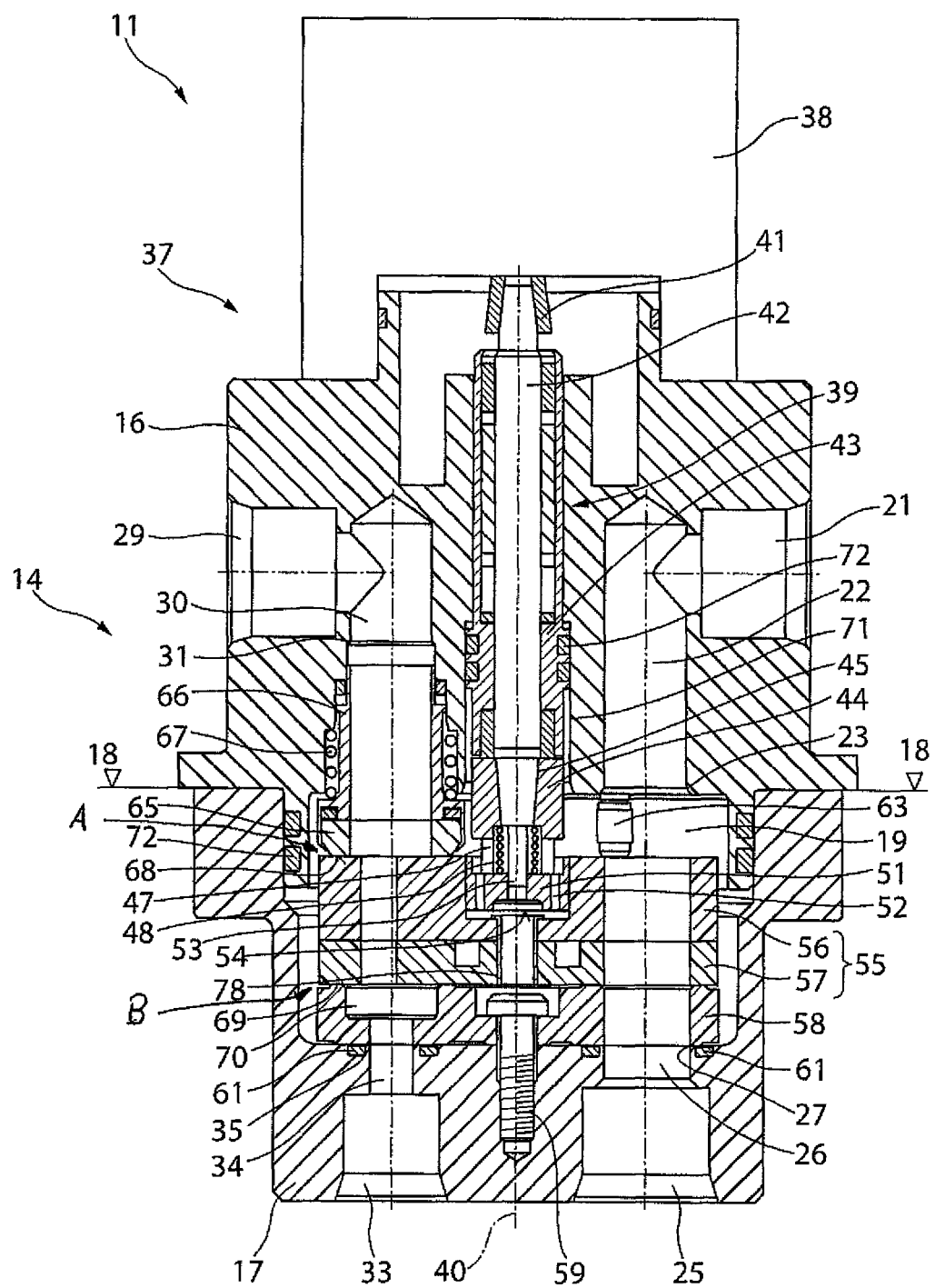

(51) Int. Cl.
*F25B 41/00* (2006.01)
*F16K 11/085* (2006.01)
*F16K 31/04* (2006.01)

(52) U.S. Cl.
CPC .......... *F16K 31/041* (2013.01); *F16K 31/043* (2013.01); *F25B 41/003* (2013.01); *F25B 41/04* (2013.01)

(56) References Cited

U.S. PATENT DOCUMENTS

| | | | | |
|---|---|---|---|---|
| 4,399,838 A | * | 8/1983 | Poujol | B60H 1/00485 123/41.09 |
| 4,625,569 A | * | 12/1986 | Toei | G01N 35/1097 73/863.72 |
| 5,308,040 A | * | 5/1994 | Torres | F16K 3/085 137/269 |
| 5,690,144 A | * | 11/1997 | Takahashi | F25B 41/046 137/625.43 |
| 5,803,117 A | * | 9/1998 | Olsen | F16K 11/0743 137/625.11 |
| 6,012,487 A | * | 1/2000 | Hauck | F16K 11/0743 137/625.11 |
| 6,076,365 A | * | 6/2000 | Benatav | F16K 11/0743 137/625.43 |
| 6,672,336 B2 | * | 1/2004 | Nichols | F16K 11/074 137/625.11 |
| 6,997,213 B1 | * | 2/2006 | Towler | B01D 15/1842 137/625.46 |
| 8,434,512 B2 | * | 5/2013 | Bergmann | F16K 11/074 137/625 |
| 8,656,955 B2 | * | 2/2014 | Price | F16K 11/074 137/625.15 |
| 8,770,226 B2 | * | 7/2014 | Wilen | F16K 11/0743 137/625.46 |
| 8,820,356 B2 | * | 9/2014 | Kannoo | F16K 11/074 137/625.43 |
| 8,844,569 B2 | * | 9/2014 | Lin | F16K 11/0743 137/625.45 |
| 9,903,479 B2 | * | 2/2018 | Yokoe | F16K 31/535 |
| 10,113,995 B2 | * | 10/2018 | Hartmann | G01N 30/20 |
| 10,302,603 B2 | * | 5/2019 | Olovsson | F16K 11/0743 |
| 2004/0026647 A1 | * | 2/2004 | Hashimoto | F16K 11/074 251/248 |
| 2004/0182456 A1 | * | 9/2004 | Rousselin | F16K 11/074 137/625.3 |
| 2007/0144594 A1 | * | 6/2007 | Moon | F16K 11/074 137/625.46 |
| 2010/0108925 A1 | | 5/2010 | Kannoo et al. | |
| 2018/0320793 A1 | * | 11/2018 | Choi | E03D 9/08 |

FOREIGN PATENT DOCUMENTS

EP        1 015 798 B1    12/2009
WO        2015/008916 A2   1/2015

* cited by examiner

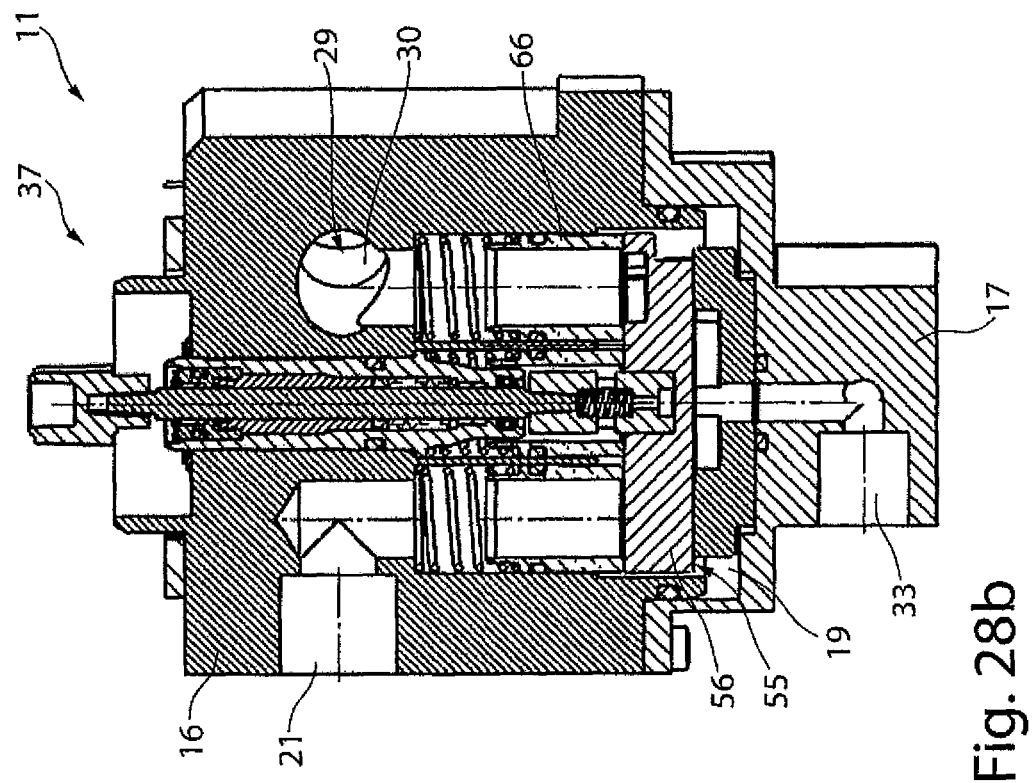
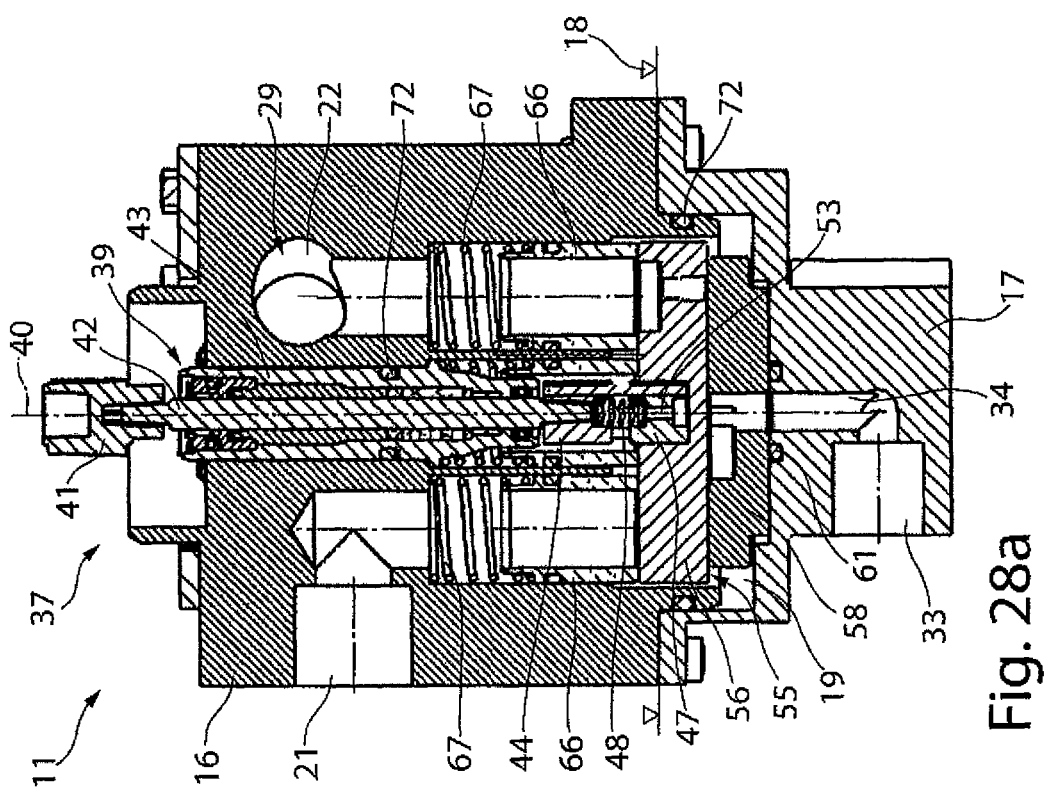

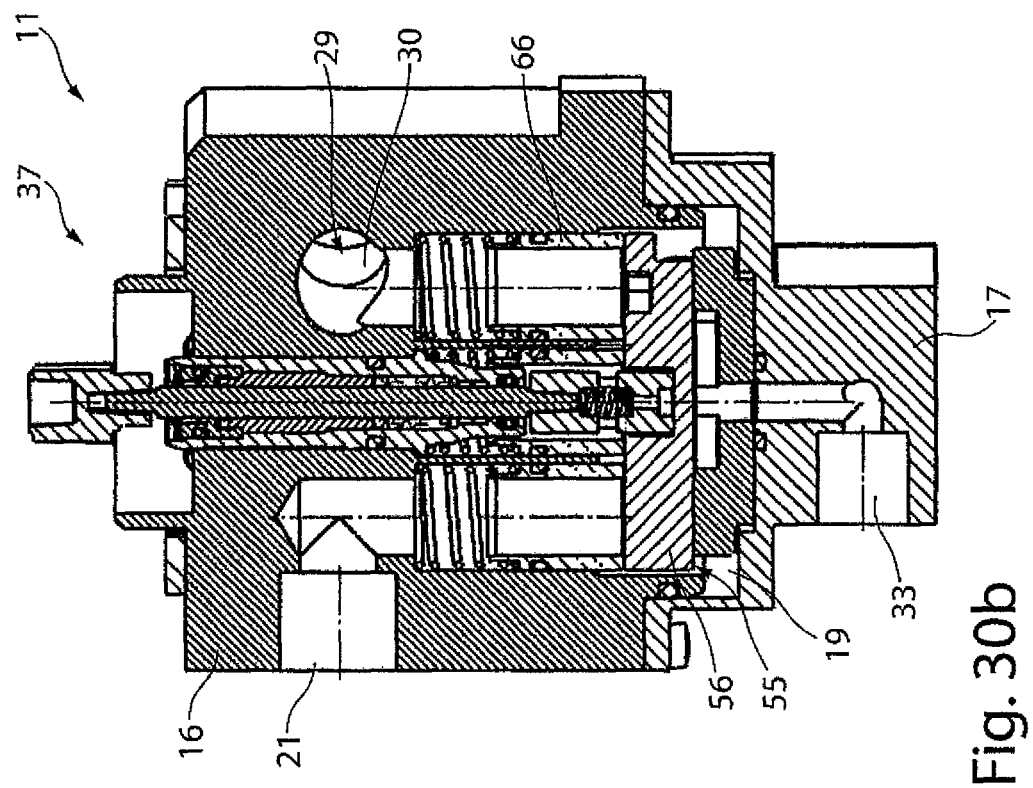
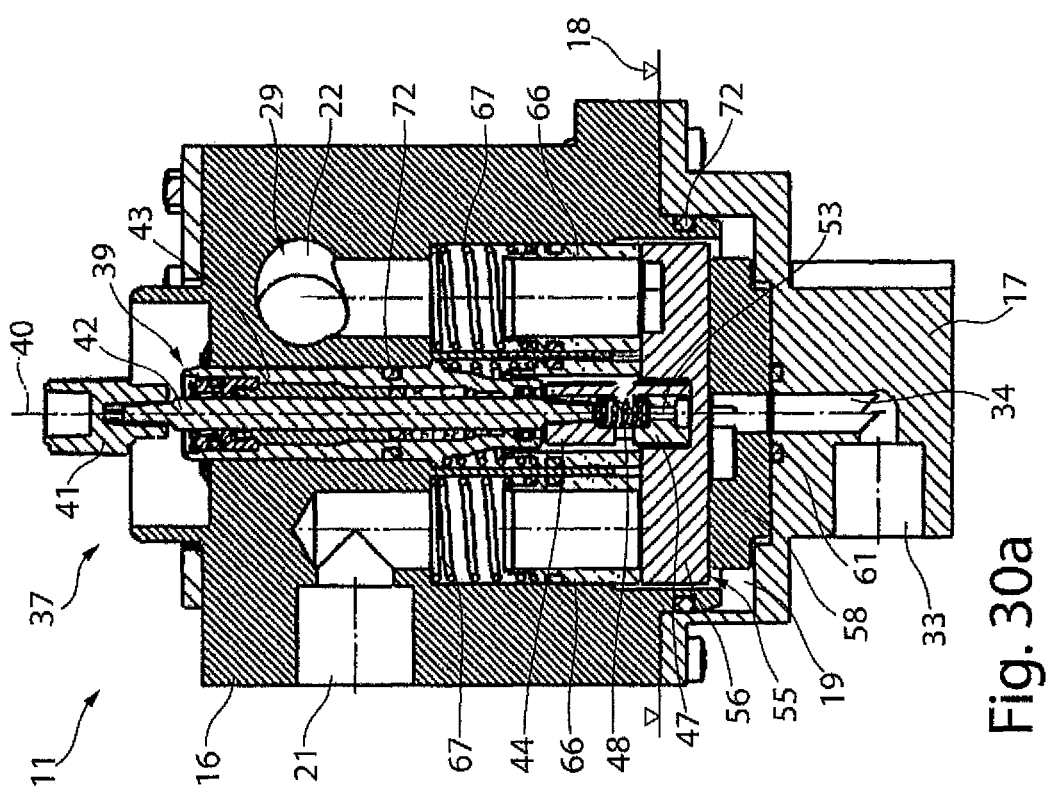
Fig. 30a
Fig. 30b

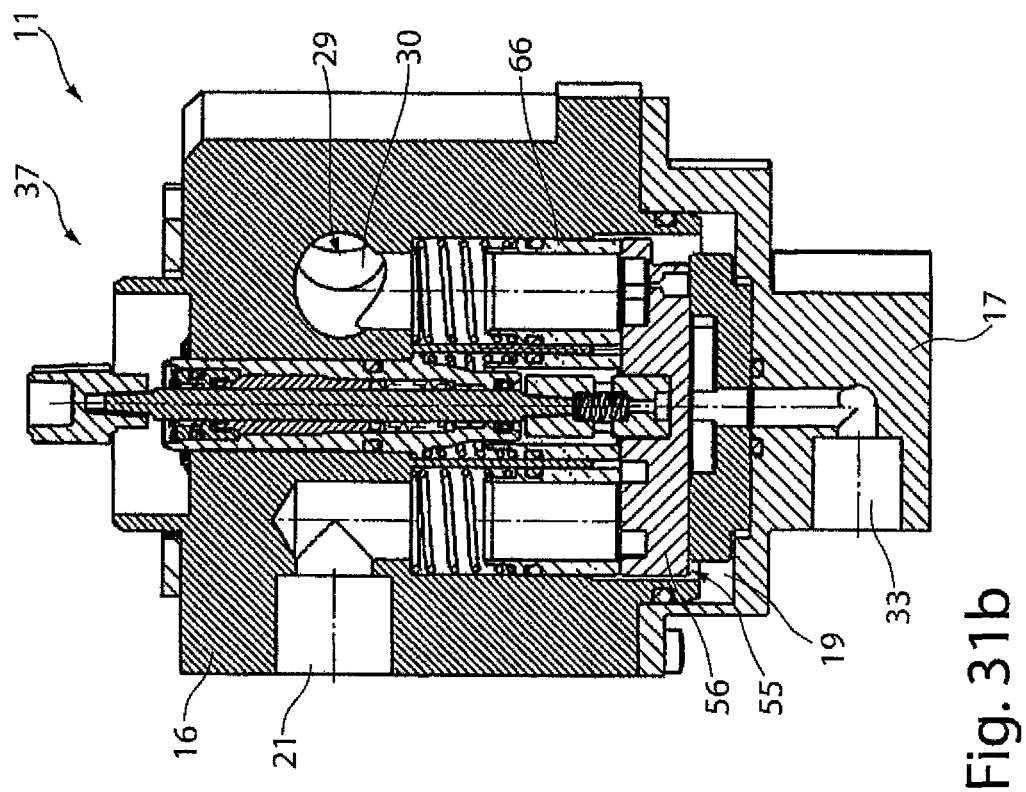
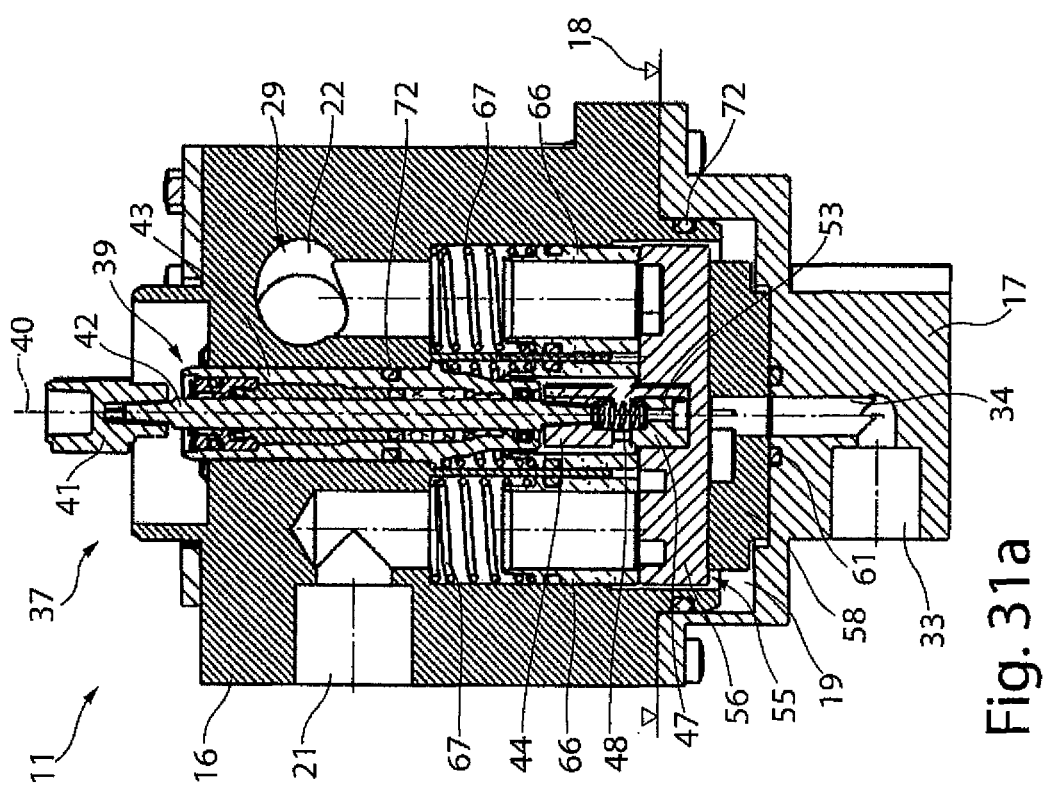

MULTIWAY VALVE FOR CONTROLLING A REFRIGERANT CIRCUIT

This application claims priority of German Patent Application No. 10 2017 102 841.2 filed Feb. 13, 2017, which is hereby incorporated herein by reference.

The invention relates to a multiway valve for controlling a refrigerant circuit of a combined air conditioning system with heat pump function.

Such systems are used for controlling the temperature of the interior of a motor vehicle, for example. DE 10 2011 118 162 A1 discloses an example of such a system, which can be operated in the air conditioning mode as well as in the heat pump mode. These systems comprised a compressor, a condenser, an internal heat exchanger with a high pressure passage and a low pressure passage for a refrigerant, as well as an expansion element and an evaporator. In the air conditioning mode, the evaporator can be used to cool and dehumidify the air flow to the interior and as a condenser to transfer heat to the surrounding air. During operation in the heat pump mode, heat from the surrounding air can be taken up by the condenser, which is now operating as an evaporator, and transferred to an air flow flowing through the heat condenser or to coolant water. The abovementioned system has four switching valves, which must be switched accordingly for the switchover of the circuit between the air conditioning mode and the heat pump mode.

The invention addresses the problem of specifying a multiway valve for a system for controlling a refrigerant circuit of an air conditioning system with heat pump function, in particular for a motor vehicle, which enables a simple and constructive design of the refrigerant circuit as well as an air conditioning mode and a heat pump mode of the refrigerant circuit.

This problem is solved by a multiway valve, in which provision is made of a housing having a first inlet opening that is connected by a first fluid channel to a regulating chamber in the housing, and which valve has a second and at least one other connection opening, which are connected by a second and at least one other fluid channel, respectively, to the regulating chamber in the housing, said valve having a actuator, which actuates a transmission element by means of a drive motor, wherein the transmission element extends in the housing between the drive motor and the regulating chamber, and having a rotary valve assembly arranged in the regulating chamber, which is coupled to the transmission element and which can be driven by a rotary motion of the transmission element about its longitudinal axis into several consecutive and divergent switching or control positions between the inlet opening and the connection openings and preferably with respect to the quantity of the relevant volume flow. Such a multiway valve with a rotary valve assembly has the advantage that by means a rotary motion, passages between the inlet opening and one or several connection openings and/or between the connection openings are enabled in a consecutive and targeted fashion. Further preference is given to enabling an actuation of the multiway valve in which the inlet opening is not closed in the air conditioning mode or heat pump mode in order to prevent damage to the running compressor, which is arranged upstream of the inlet opening. A controlled switchover from an air conditioning mode to a heat pump mode and back again is thus made possible. Such a multiway valve thus permits the actuation and/or control of both of the abovementioned operating modes. This also permits a compact design of the refrigerant circuit for the combined air conditioning system and heat pump.

Provision is preferably made such that the rotary valve assembly, in a first switching or control position for actuating a first operating mode, in particular the air conditioning mode, connects the inlet opening to a second connection opening and mutually bypasses a third and a fourth connection opening, for example, and preferably closes them tightly with respect to the inlet opening and the second connection opening.

Figure 11:
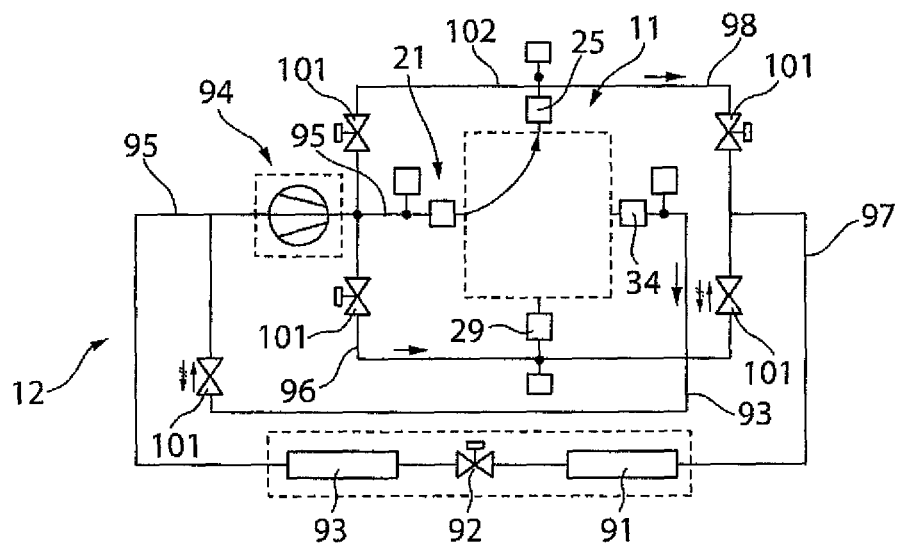

The rotary valve assembly can preferably be positioned in a second switching or control position for actuating another operating mode. In this second switching position, which is depicted in FIG. 11, the rotary valve assembly connects the inlet opening to the second outlet opening. The third outlet opening and the fourth outlet opening are each blocked or tightly closed.

The rotary valve assembly can preferably be brought into a third switching or control position for actuating another operating mode. This third switching position is depicted in, for example, FIG. 14. The inlet opening is connected to the second as well as to the third connection opening. The fourth connection opening is closed.

Figure 17:
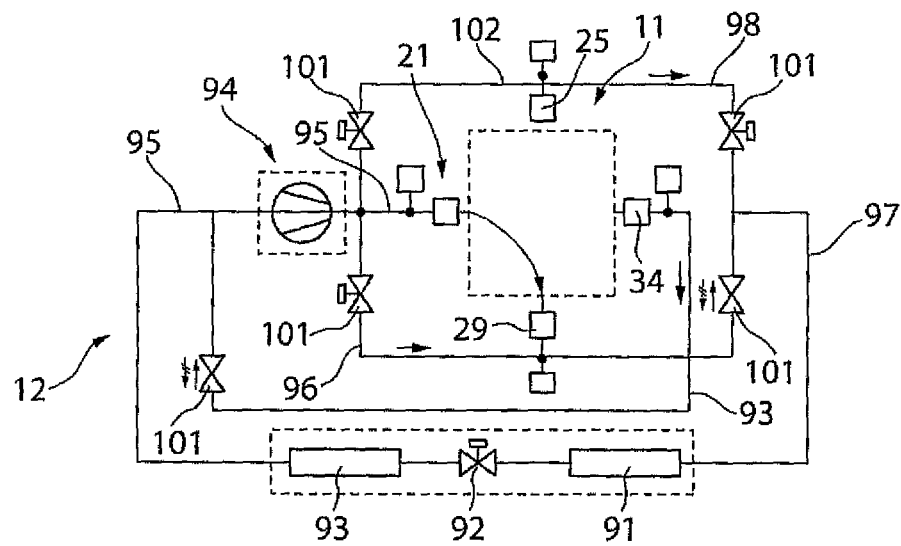

Provision is preferably made for a fourth switching or control position of the rotary valve assembly, in which the inlet opening is connected to the third connection opening (FIG. 17). The second connection opening and the fourth connection opening are each closed.

Figure 20:
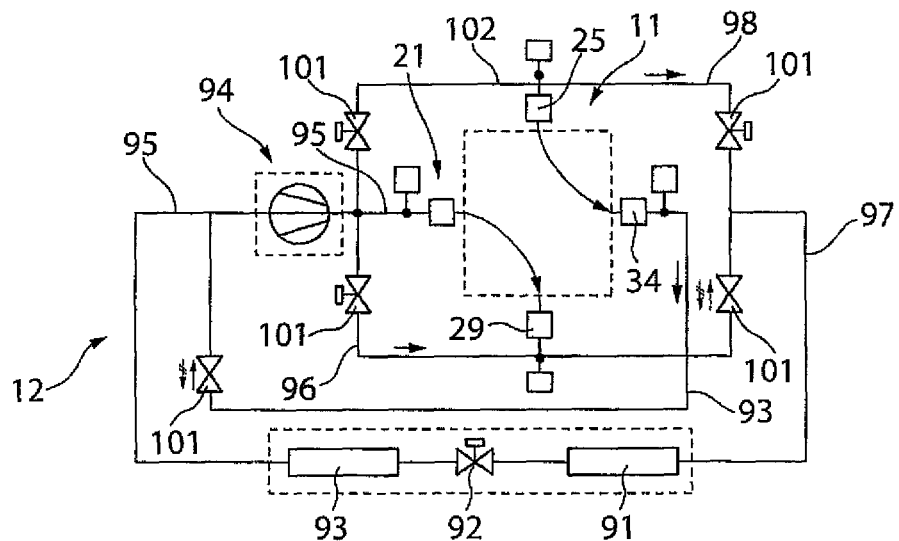

The rotary valve assembly can preferably be set to a fifth switching position, which is depicted in FIG. 20. In this position, the rotary valve assembly connects the inlet opening to the third connection opening and the second connection opening to the fourth connection opening.

Figure 23:
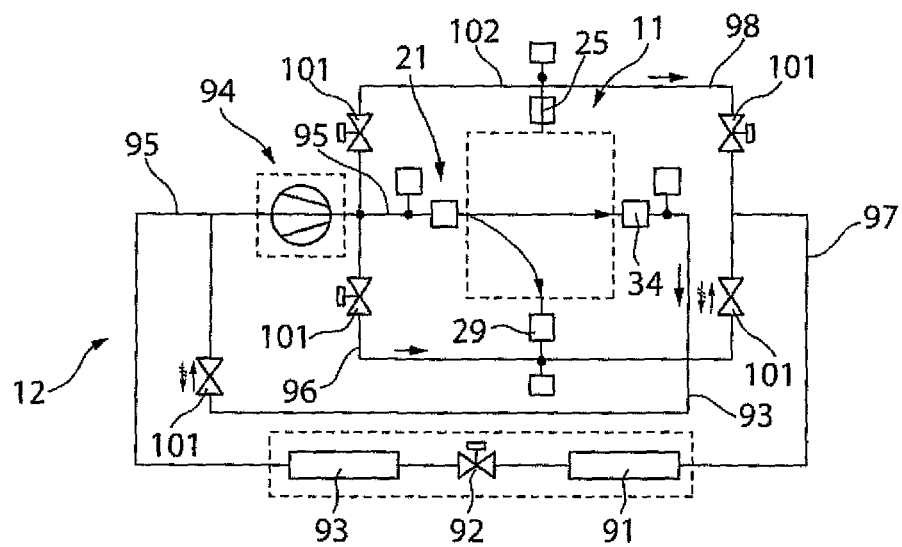

The rotary valve assembly can preferably be positioned in another, i.e. a sixth, switching position (FIG. 23). In this position, the inlet opening is connected to the third connection opening and to the fourth connection opening. The second connection opening is blocked or tightly closed.

The rotary valve assembly is advantageously configured in such a way that in the switching positions described in the preceding, it is not possible to establish a bypass between the inlet opening and the fourth outlet opening. The other switching positions described in the preceding can be actuated in any desired order relative to each other or in a predetermined order for actuating specific operational processes, such as the switchover from an air conditioning mode to a heat pump mode and vice versa, as well as optionally to a flushing mode arranged in between.

Figure 26:
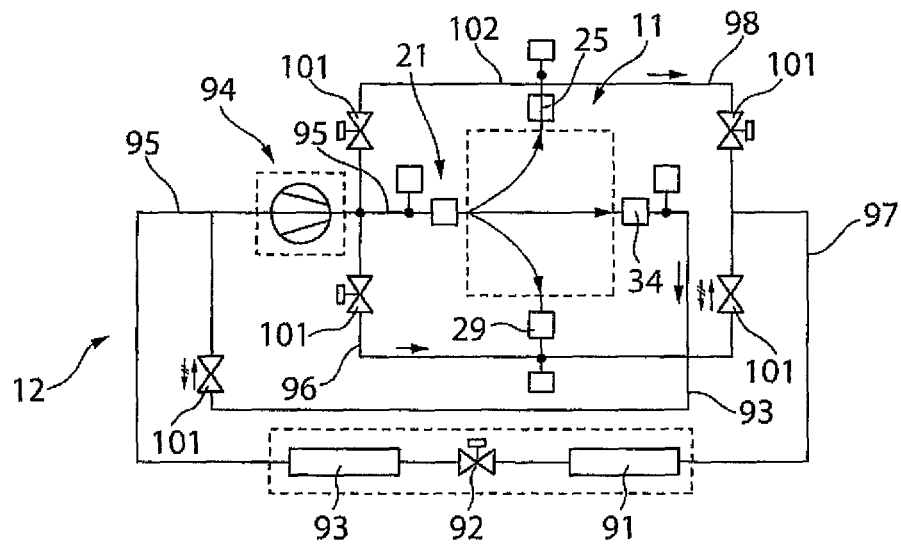

The rotary valve assembly can furthermore be set to a seventh switching position, which is depicted in FIG. 26. In this switching position, the inlet opening is connected to the second connection opening, to the third connection opening, and to the fourth connection opening so that the connection openings of the multiway valve are all supplied jointly by the inlet opening. This switching position is preferably only used for service or filling purposes.

According to a preferred embodiment, the multiway valve can have at least a second inlet opening in the housing, which can be connected to the first inlet opening and/or to the at least one other connection opening. In the case of such a multiway valve, for example, a rotary valve assembly can be used to actuate two volume flows flowing separately through the multiway valve. A crossways interconnection of the volume flows or a merging of the volume flows is also possible. In the case of such a multiway valve, it is furthermore possible for the two volume flows to flow in opposite directions through the rotary valve assembly; this can be advantageous in terms of the optionally divergent temperatures of the volume flows.

The multiway valve furthermore has a two-part housing that comprises an upper housing part and a lower housing part, wherein a parting plane of the upper housing part and of the lower housing part lies in the regulating chamber. This permits easy installation of the rotary valve assembly in the regulating chamber and positioning of the transmission element in the housing.

Provision is preferably made such that the rotary valve assembly is composed of at least a first control disc and a second control disc that are rigidly interconnected. Designing the rotary valve assembly with at least two control discs, which are initially separate from one another, can give rise to increased flexibility in the designing of openings and/or channels.

Preference is given to providing an anti-rotation lock, which permits an alignment of the at least a first disc and second discs. In addition, provision is preferably made such that the rotary valve assembly can be actuated by a rotary motion of the transmission element about the longitudinal axis of the transmission element. A controlled adjusting movement is thus possible. In addition, different switching positions can be easily actuated.

The first and the at least one second control disc of the rotary valve assembly have through-bores that are arranged separately from one another, which are aligned flush with one another and advantageously lie on a common circumference. The rotary motion of the rotary valve assembly thus makes it possible to actuate the different switching positions and open different passages.

A first through-bore, which preferably extends along a circumferential angle of at least 90°, is preferably arc segment-shaped. In particular a large volume flow can thus be guided from the inlet opening to the second outlet opening in order to enable a rapid heating-up in the heat pump mode. Another through-bore in the control discs is drop-shaped. A third through-bore is bar-shaped. The latter are smaller in cross section and are used for suctioning the evaporator or the compressor, respectively, when changing the switching position from the air conditioning mode to the heat pump mode and vice versa.

Another preferred embodiment of the first control disc has a trough-shaped recess, which is opposite the second control disc and which adjoins the arc segment-shaped aperture. Another recess is preferably provided opposite the trough-shaped recess at the other end of the first aperture. A flow channel that encompasses up to 180° can be formed jointly by the recesses and the arc segment-shaped through-bore.

In the second control disc, another advantageous design of the rotary valve assembly provides an open channel directed toward the first control disc, which on the relevant end has an opening directed toward the lower housing part, the open channel being sealed off or tightly closed by the first control disc after positioning with respect to the second control disc. The openings formed in each case at the end of the channel preferably lie on the circumference of the apertures. A so-called "back channel" or "bypass channel" can thus be created. This comes into play in particular when moving the rotary valve assembly into a switching position for the heat pump mode, as it permits a suction of the air conditioning circuit.

Furthermore, a control disc is preferably arranged fixed to the lower housing part on an underside of the regulating chamber. This has the advantage that the rotary valve assembly, which is formed from at least one, preferably two control discs, is slidably mounted on another control side, which makes it possible to achieve a good seal as well as a low level of friction.

In particular, the control discs are made of a wear-resistant and/or low-friction material such as ceramic. A material with a friction coefficient of less than 0.2 is preferably provided. Furthermore, provision can preferably be made such that the control discs are made of a wear-resistant and/or low-friction plastic material with polished or lapped functional surfaces, wherein the functional surfaces are preferably made of Duroplast.

Furthermore, provision is preferably made such that the rotary valve assembly is composed of at least a first and a second control disc, which are sintered or baked together or configured as a 3D load bearing component. This has the advantage that a passage channel or connection channel formed in between is completely closed, in particular sealed. It is thus possible to dispense with additional screw connections for sealing and/or for preventing the control discs from turning relative to each other.

A first control disc of the rotary valve assembly, which is directed toward the transmission element, receives a carrier, which can preferably be inserted non-rotatably in an open-edged recess. This carrier is preferably made of a material different from that of the control disc. Plastic can be advantageously provided for this purpose. Premature deterioration in the case of a rotary drive by means of the transmission element is thus prevented.

Furthermore, an intermediate adapter is preferably provided between the carrier and the shaft. This intermediate adapter enables stress decoupling, particularly in the event of temperature changes between the transmission element and the rotary valve assembly. In addition, possible positional and/or tolerance errors between the transmission element and the rotary valve assembly can thus be compensated.

The intermediate adapter is advantageously fastened to the transmission element by clamping or tensioning, particularly by interlocking. For example, the intermediate adapter can be fastened by a cone on the transmission element locking automatically with a cone-shaped opening.

Relative to the carrier, the intermediate adapter is furthermore slidable in an axial direction and preferably positioned in a spring-loaded manner. This also enables a tolerance compensation.

The intermediate adapter and the carrier are preferably configured as a bolt coupling. The intermediate adapter advantageously comprises at least one carrier element, which is provided in such a way that it is preferably axially slidable and locked against rotation with at least one complementary carrier element in the carrier. Advantageously, the carrier element is configured as a bolt of spring steel or as a pin, and the complementary carrier element is configured as a borehole or aperture, wherein the bolt is preferably provided on the intermediate adapter and engages in a borehole on the carrier. This in turn permits an actuation of the rotary motion, but also an axial displaceability of the carrier relative to the intermediate adapter on the one hand and relative to the first control disc of the rotary valve assembly on the other hand, wherein the anti-rotation lock is maintained.

Between an upper side of the regulating chamber and the first control disc, provision is made of at least one hold-down device, by means of which the first control disc and the second control disc are pressed against the third control disc. A sealing effect can thus be achieved between the rotary valve assembly and the third control disc, yet the rotary valve assembly can be arranged rotatably in the regulating chamber.

A seal is provided in each case between the third control disc and the respective orifices leading to the second and fourth connection openings, and another sealing assembly is provided between the first control disc and the orifice of the third fluid channel. The passages from the rotary valve assembly to the adjacent connection opening can each be sealed in this manner. These passages from the regulating chamber into the three connection openings are sealed. Hence no further sealing of the fluid channel into the regulating chamber or of the inlet opening into the regulating chamber is needed.

Another preferred design of the valve makes provision such that the drive motor actuates a transmission element that is sealed in a gas-tight manner with respect to the atmosphere. This ensures that the medium present outside the housing does not get into the circuit.

The rotary valve assembly of the multiway valve, by means of a back-and-forth rotary motion within an allocated switching or turning range (preferably up to 175°) about its rotation axis, leads to a sequence of switching positions that permit the switchover from the air conditioning to the heat pump mode and simultaneously a suction of the evaporator or of the condenser in between for an optimum operation and change.

Provision is preferably made such that in the upper housing part, the fluid channel formed between the regulating chamber and the inlet opening and the fluid channel formed between the regulating chamber and the third connection opening are aligned parallel to one another and each have an orifice opening into an upper side of the regulating chamber, and in the lower housing part, the fluid channel formed between the regulating chamber and the second connection opening and the fluid chamber formed between the regulating chamber and the fourth connection opening each have an orifice in a lower side of the regulating chamber. This has the advantage that in each case two mutually opposite fluid channels are provided so as to give rise to a straight flow channel in a switching position in which, for example, the inlet opening is connected to the second connection opening, thus preventing flow losses.

The orifices opposite one another on the upper side and on the lower side of the regulating chamber are preferably aligned flush and advantageously have a same distance to a longitudinal axis of the transmission element, which in particular corresponds to a longitudinal axis of the housing. Simple geometric relationships for the actuation thereof by the rotary valve assembly can thus be created. In addition, the rotary valve assembly enables a consecutive opening and closing of the orifices, with the exception of the inlet opening.

Furthermore, provision is preferably made such that a refrigerant can be supplied to the regulating chamber via the inlet opening in all switching positions of the rotary valve assembly. The regulating chamber is thus flooded via this inlet opening. A corresponding continuance to the connection openings can take place in function of the switching position of the rotary valve assembly.

Another preferred design of the multiway valve makes provision such that the drive motor actuates the individual switching or control positions. For example, the drive motor can comprise an incremental encoder, by which a traversing motion, particularly the rotary motion or rotation angle for changing the position of the rotary valve assembly, can be actuated in a defined manner. The volume flow or flows flowing through the multiway valve can also be regulated in this manner. The drive motor preferably comprises a control for precise travel to the switching positions.

A preferred embodiment of the multiway valve makes provision such that a pressure-loaded area of the sealing element, which is allocated to a connection opening, and a pressure-loaded area of a third control disc in the housing, which is allocated to another connection opening, are in a ratio of between 0.25 and 2, preferably in a ratio of 1, in other words have the same surface area. The pressure-loaded area of the sealing element is preferably delimited by the outer circumference of the sealing geometry of the sealing element directed toward the first control disc of the rotary valve assembly. The pressure-loaded area of the third control disc is preferably delimited by the outer circumference of a low pressure surface surrounding the opening of the third control disc. Adapting the two pressure-loaded areas to one another, which are each situated in the transition zone of the regulating chamber to the respective adjoining connection openings, makes it possible to achieve a sealed arrangement between the rotary valve assembly and the respective connections in function of the switching or control positions. Strength ratios can thus be created so that the high pressure acting between the first control disc and the sealing element on the one hand and between the second control disc and the third control disc on the other hand will not cause the control discs to separate from one another and/or the sealing surfaces to separate from the control discs.

Figure 2:
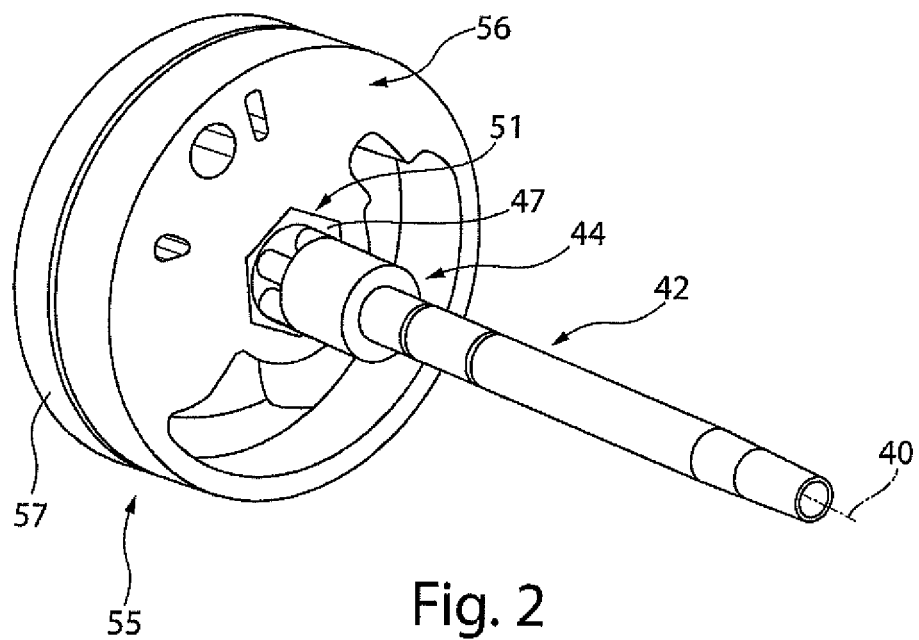
Figure 3:
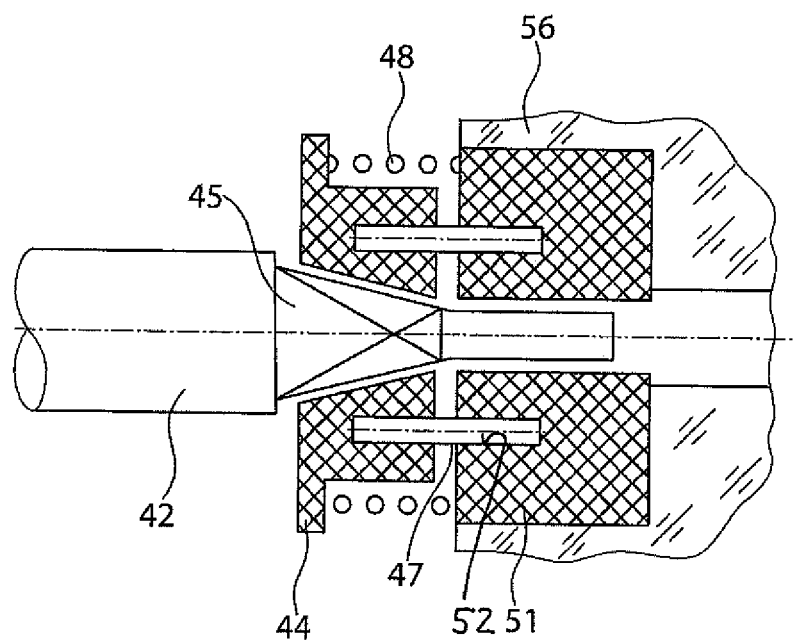
Figures 4, 5:
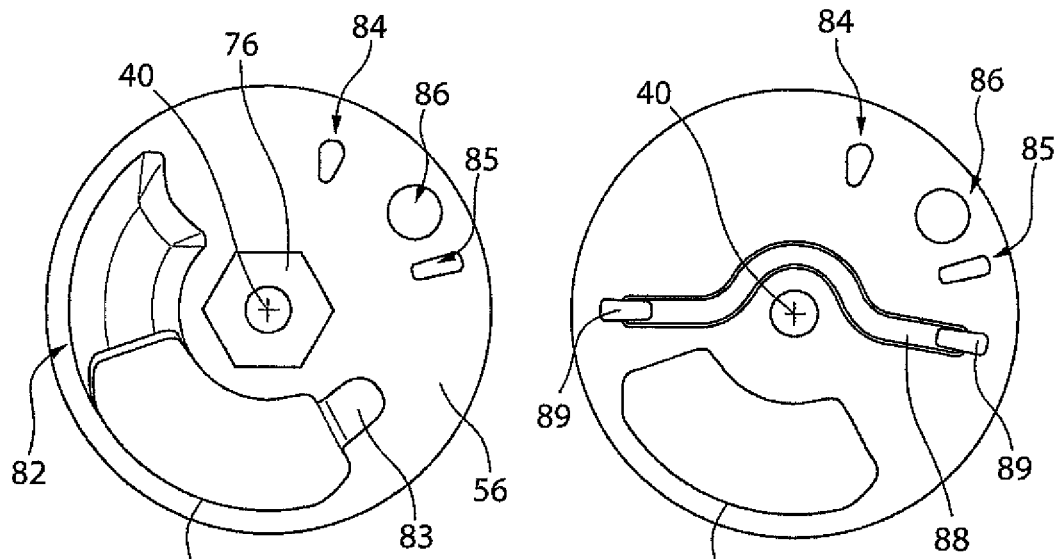
Figure 6:
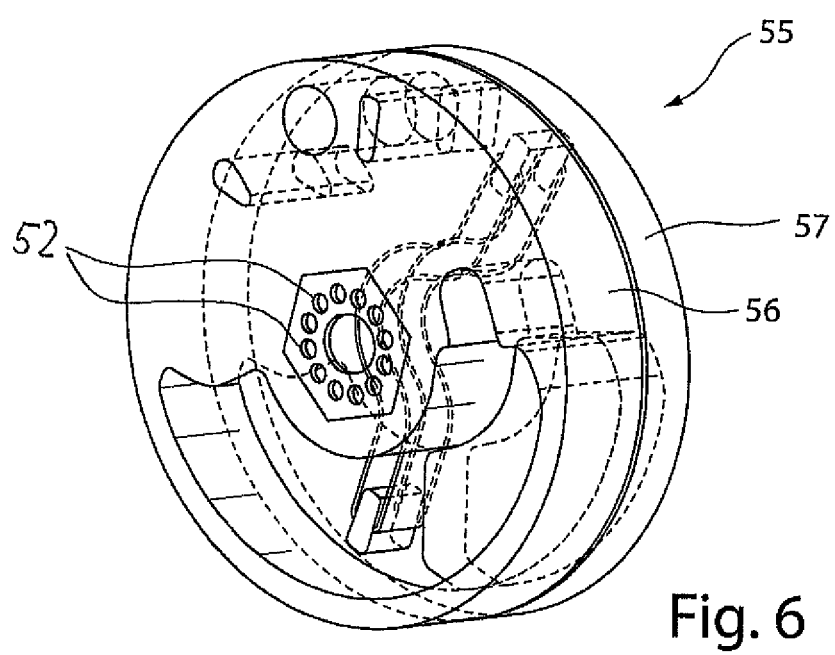
Figure 7:
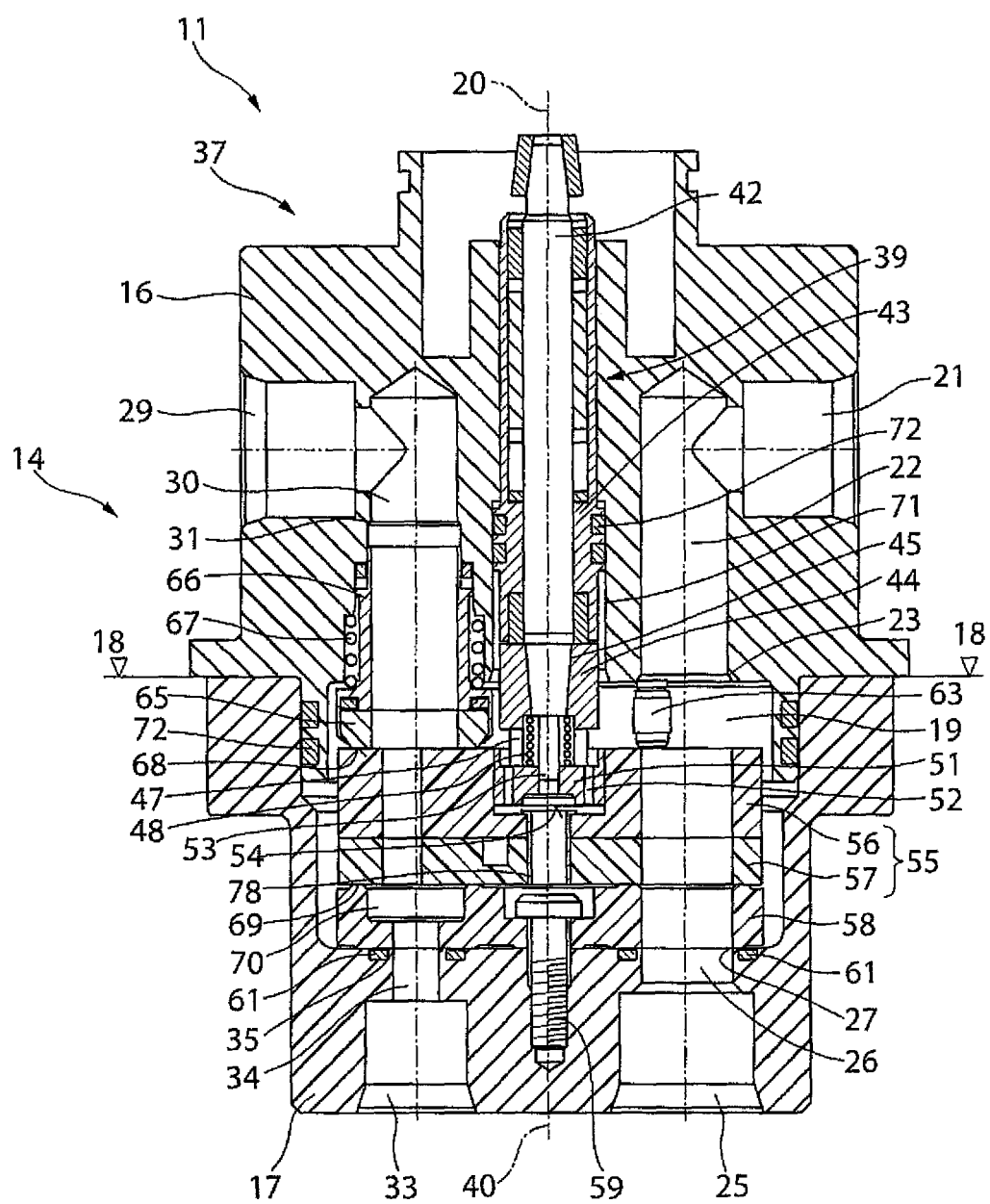
Figure 8:
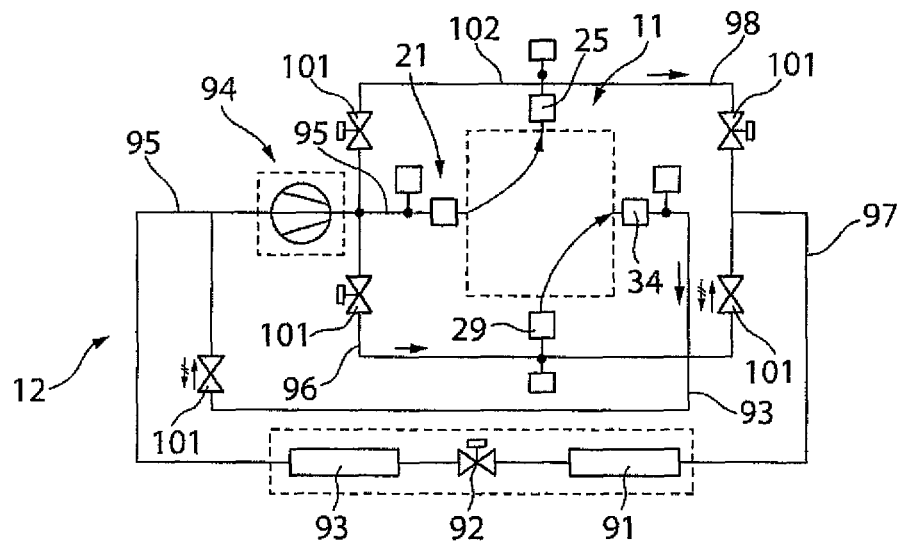
Figure 9:
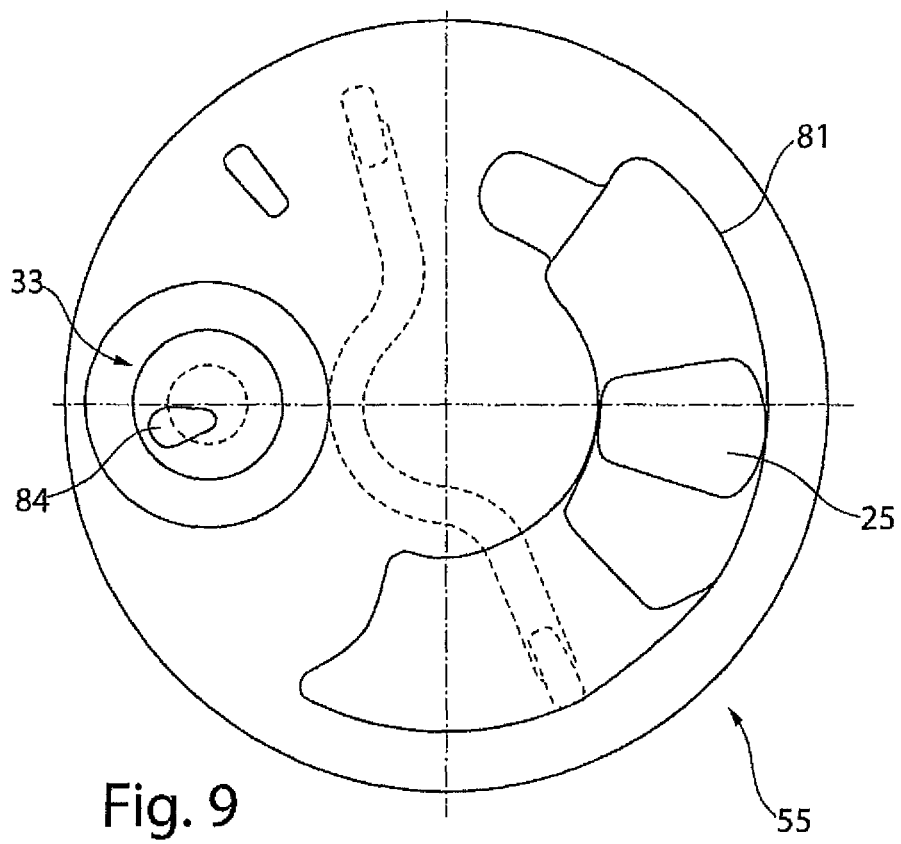
Figure 10:
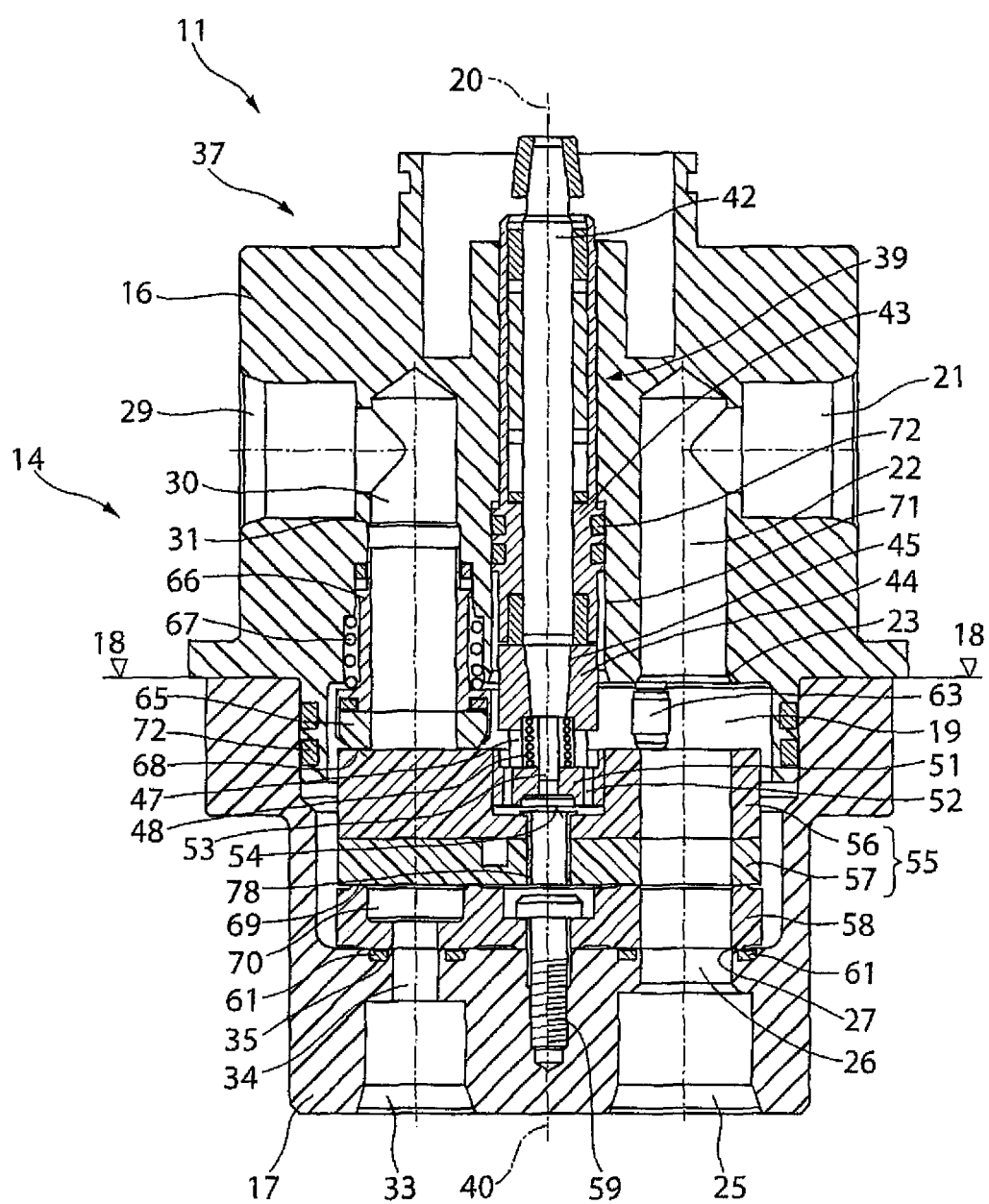
Figure 12:
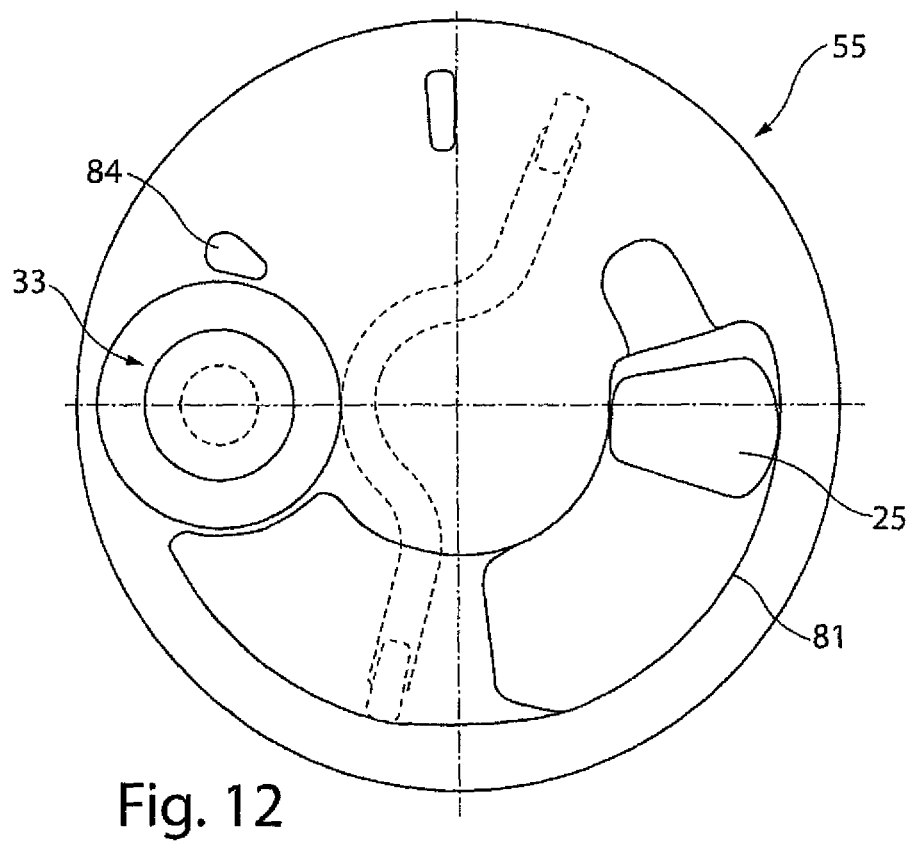
Figure 13:
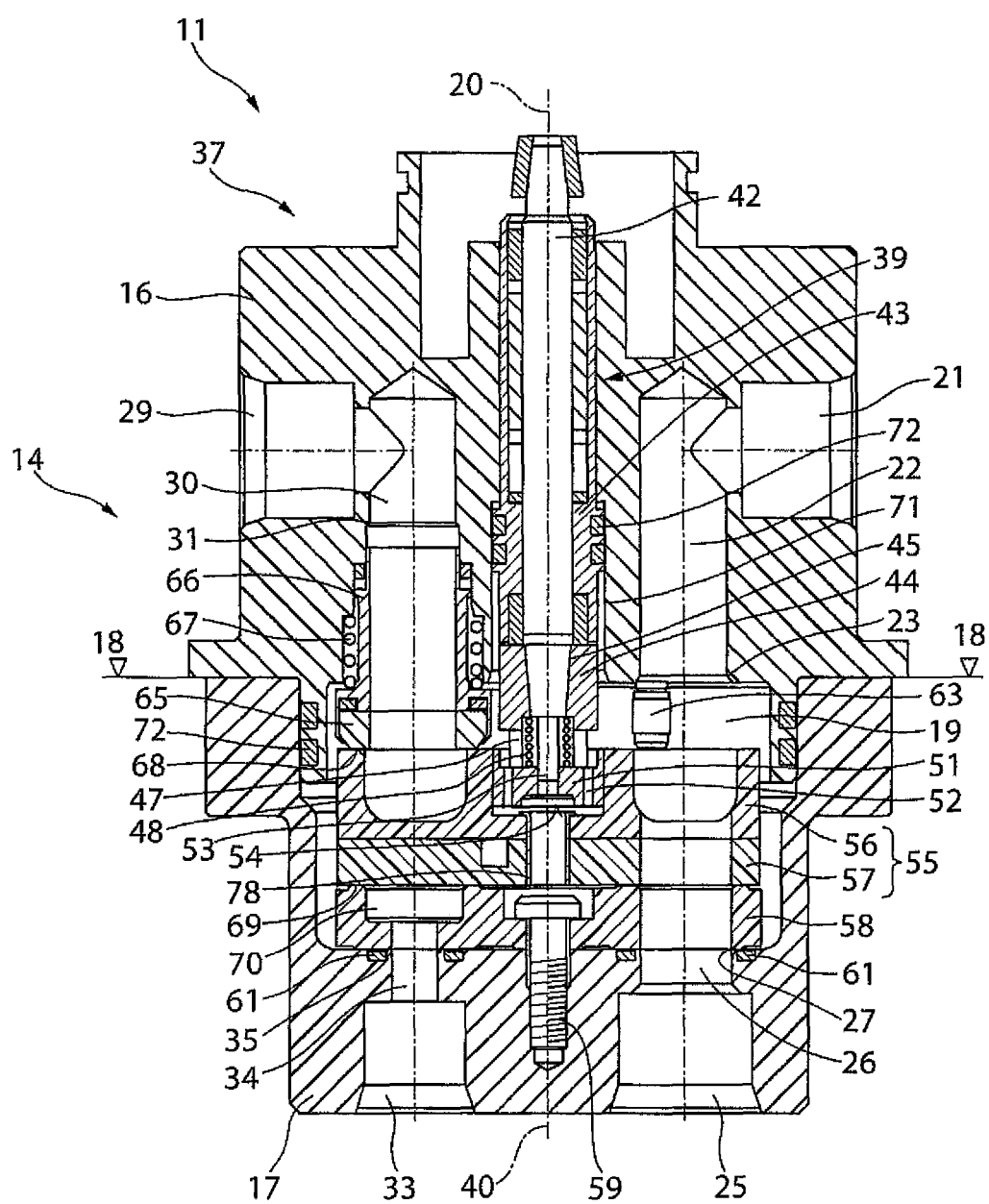
Figure 14:
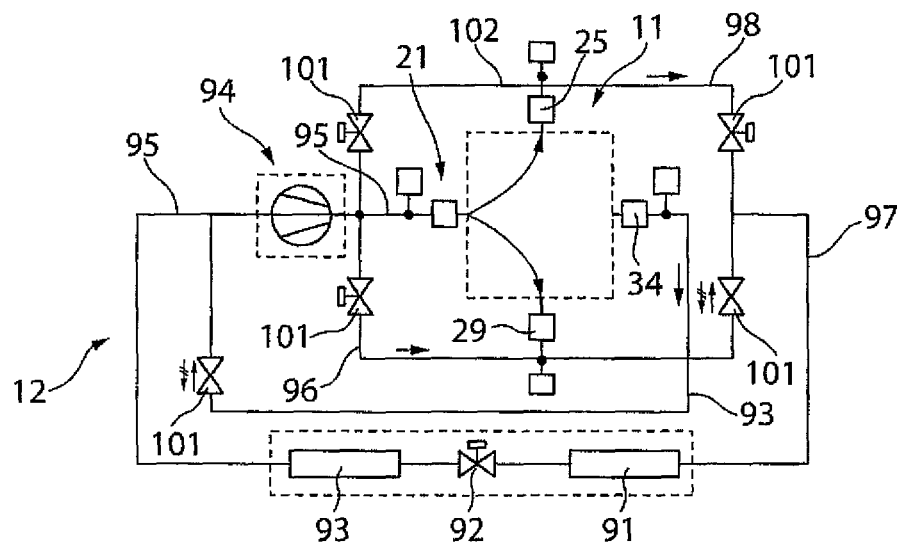
Figure 15:
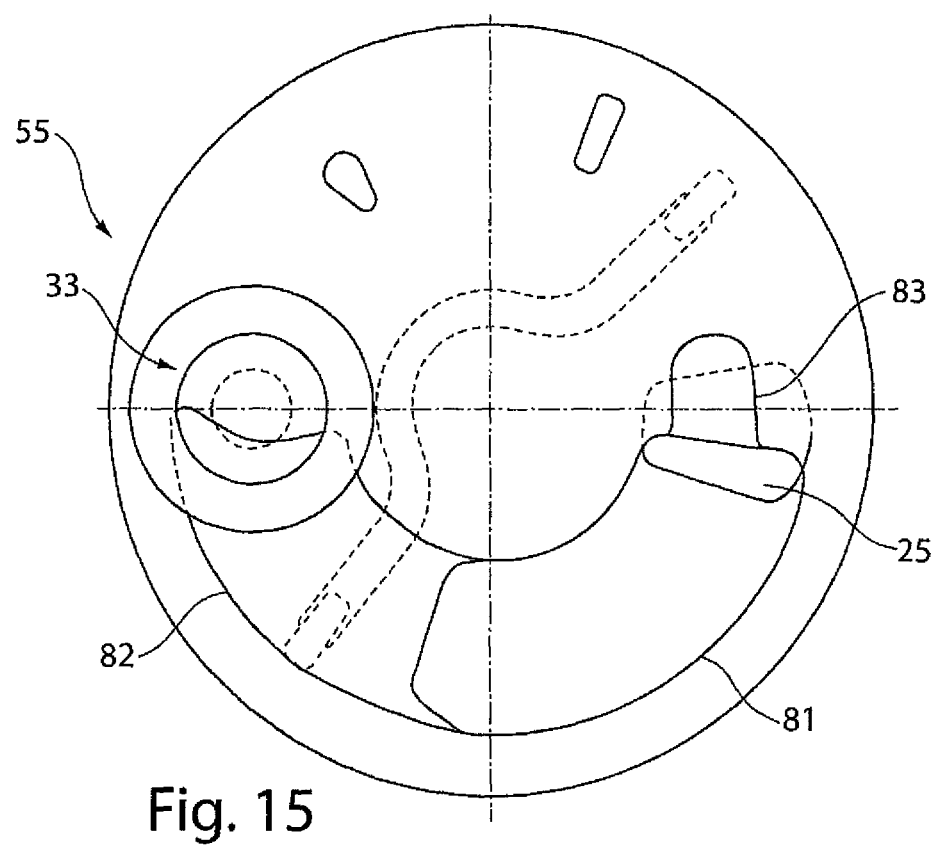
Figure 16:
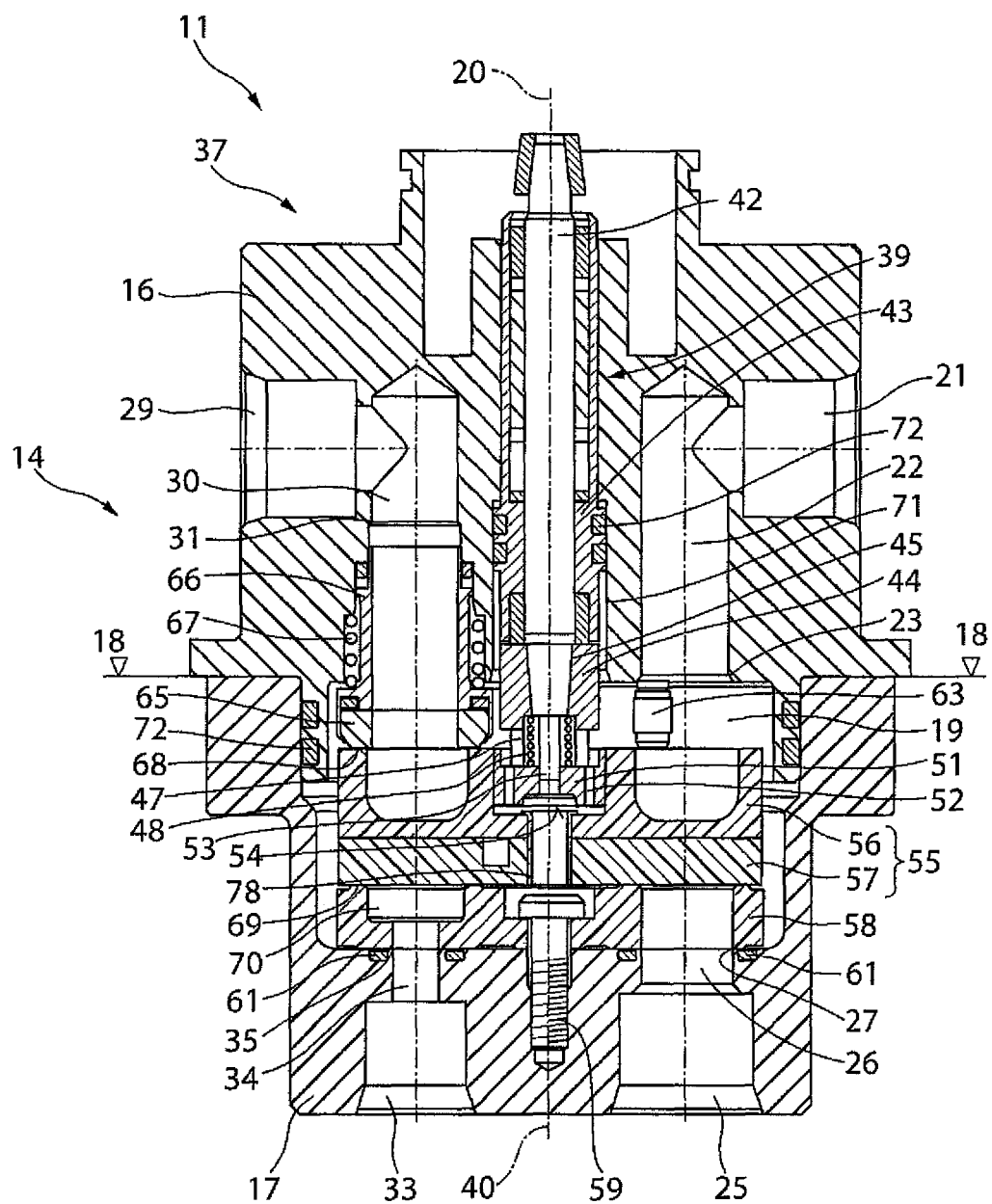
Figure 18:
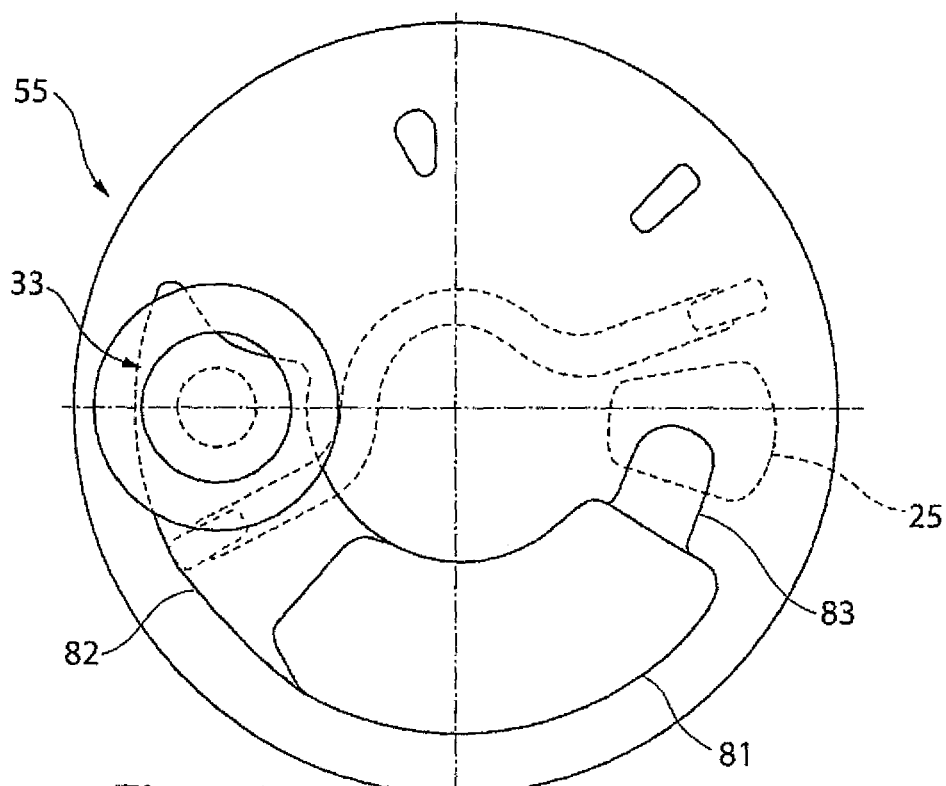
Figure 19:
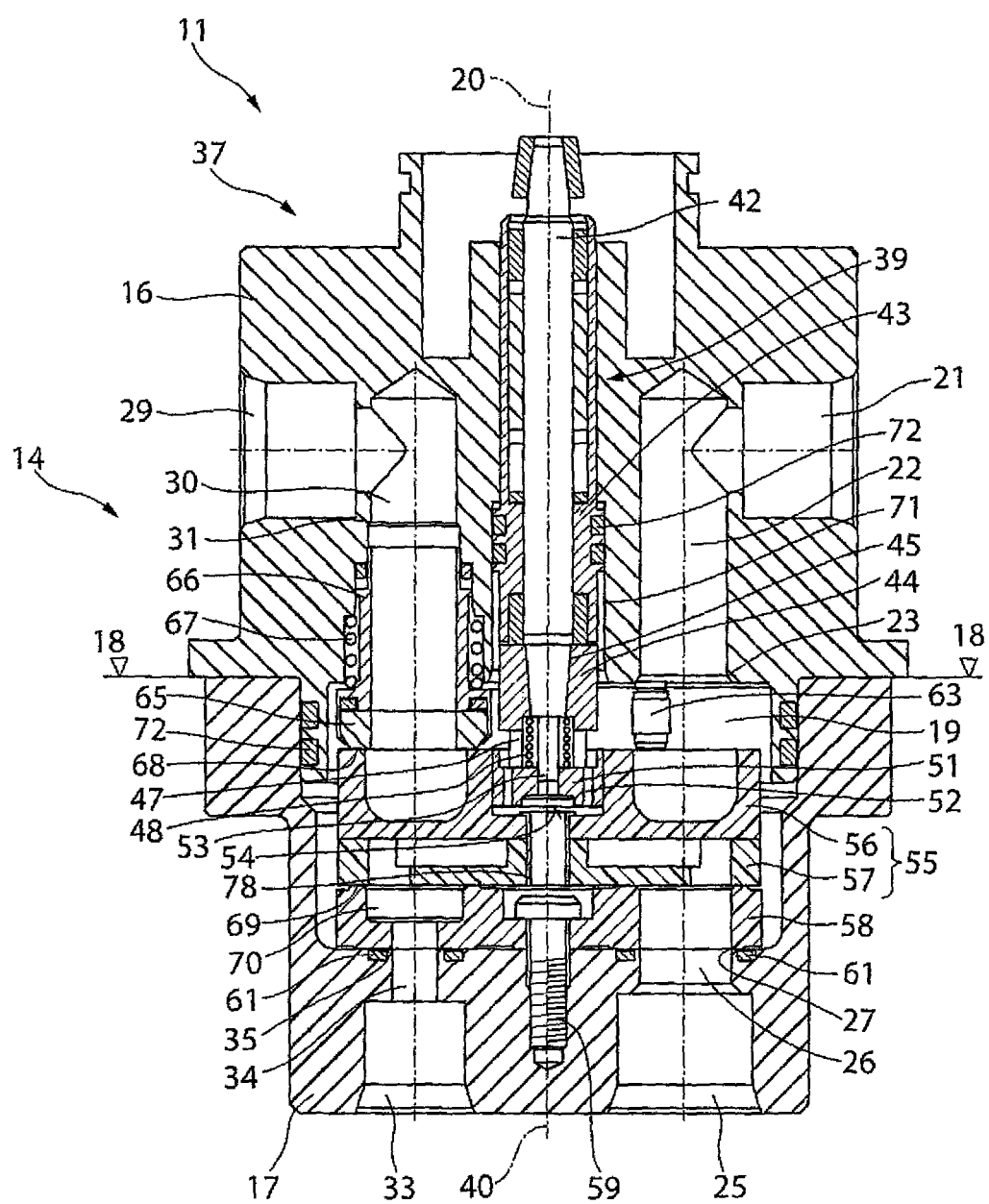
Figure 21:
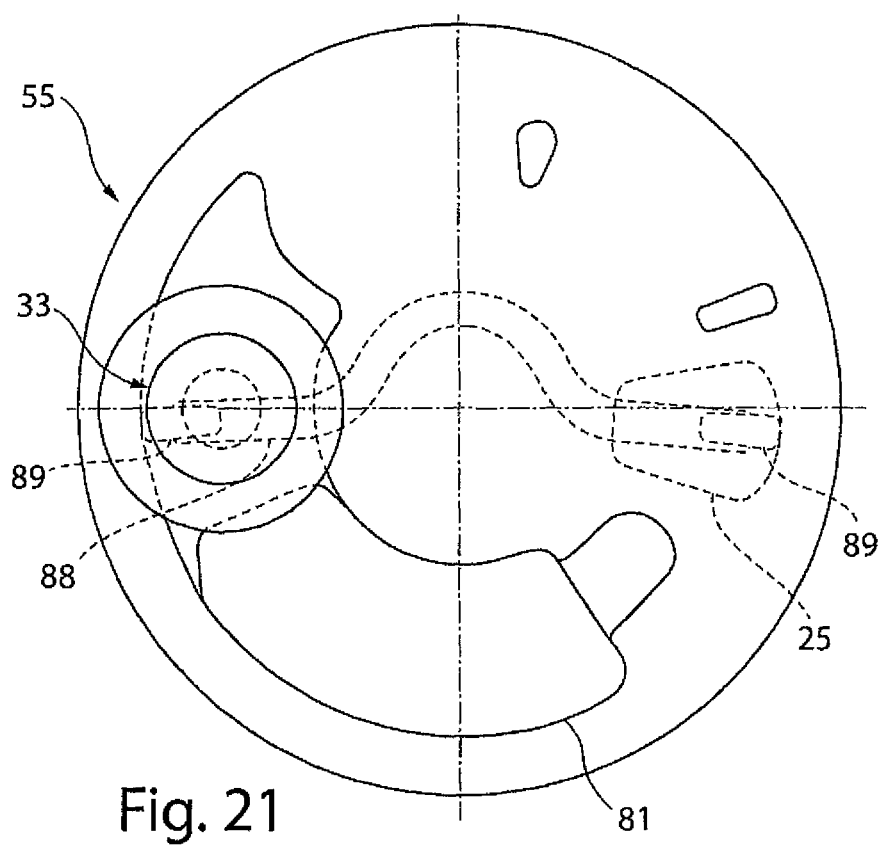
Figure 22:
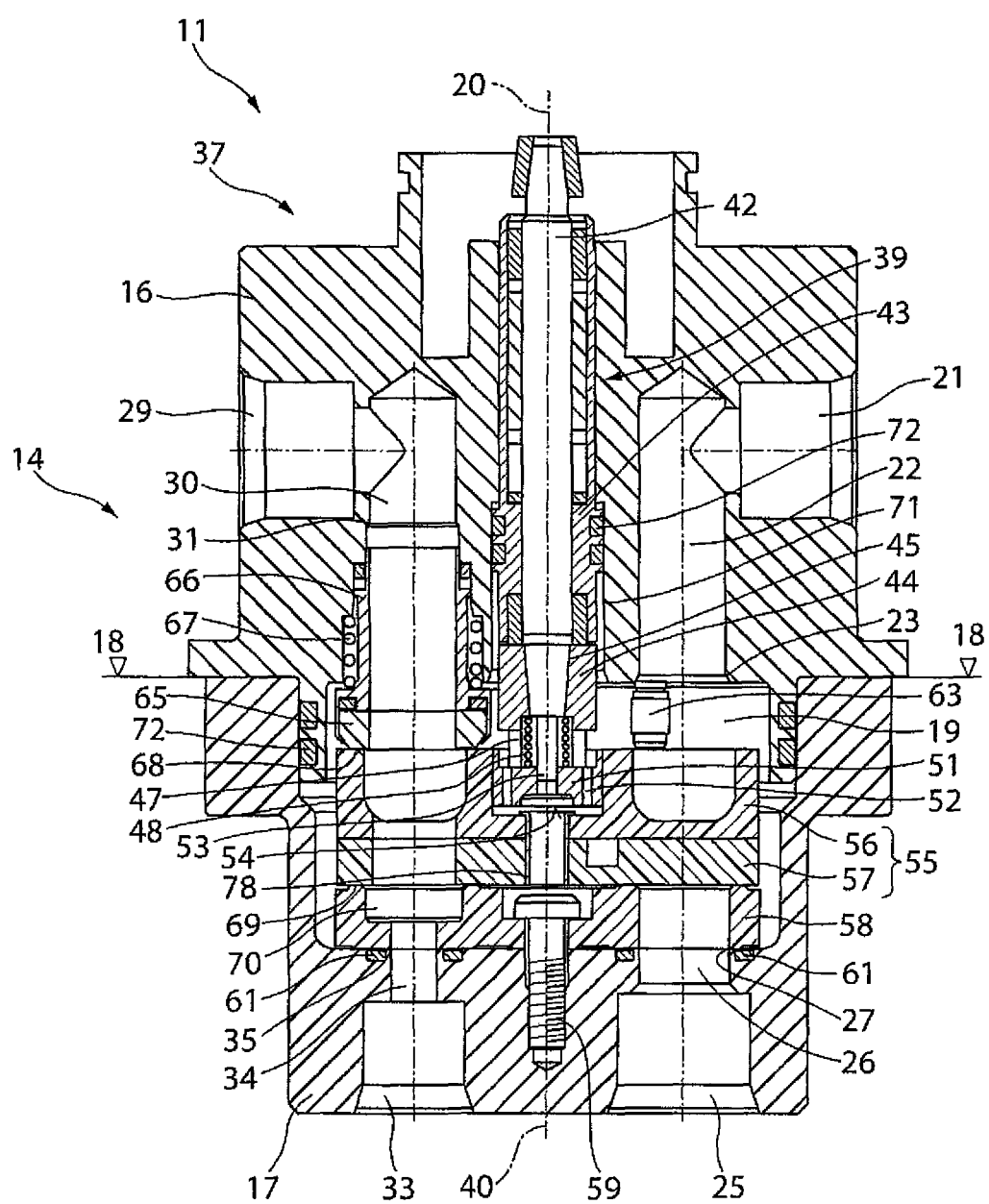
Figure 24:
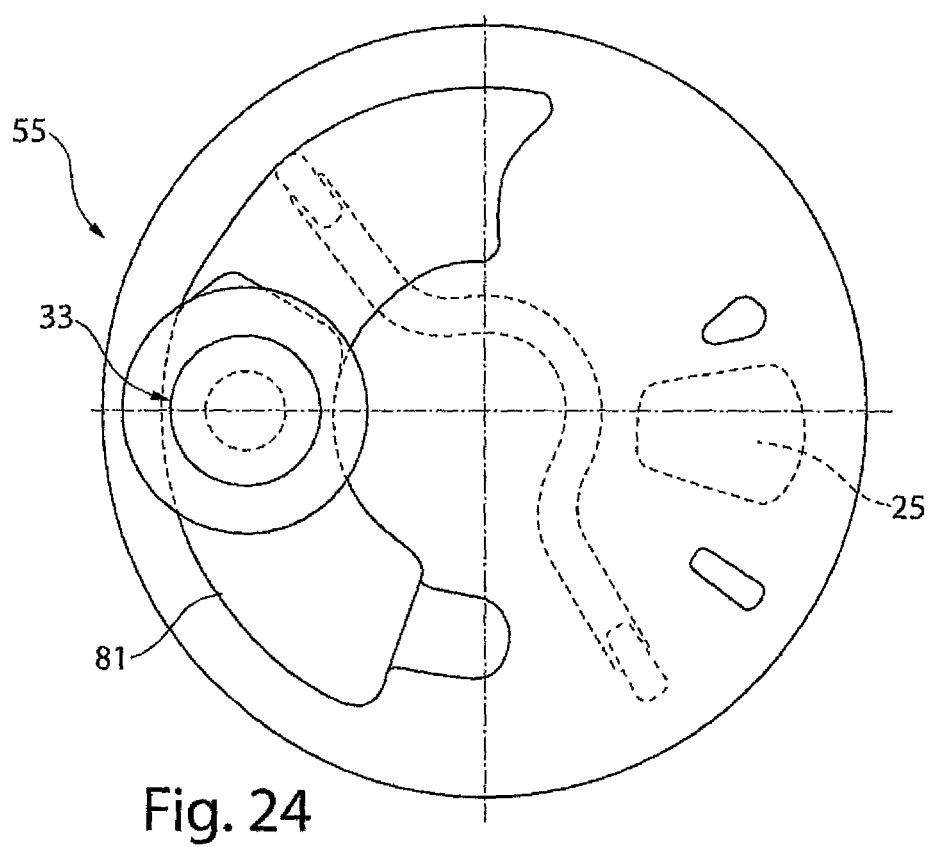
Figure 25:
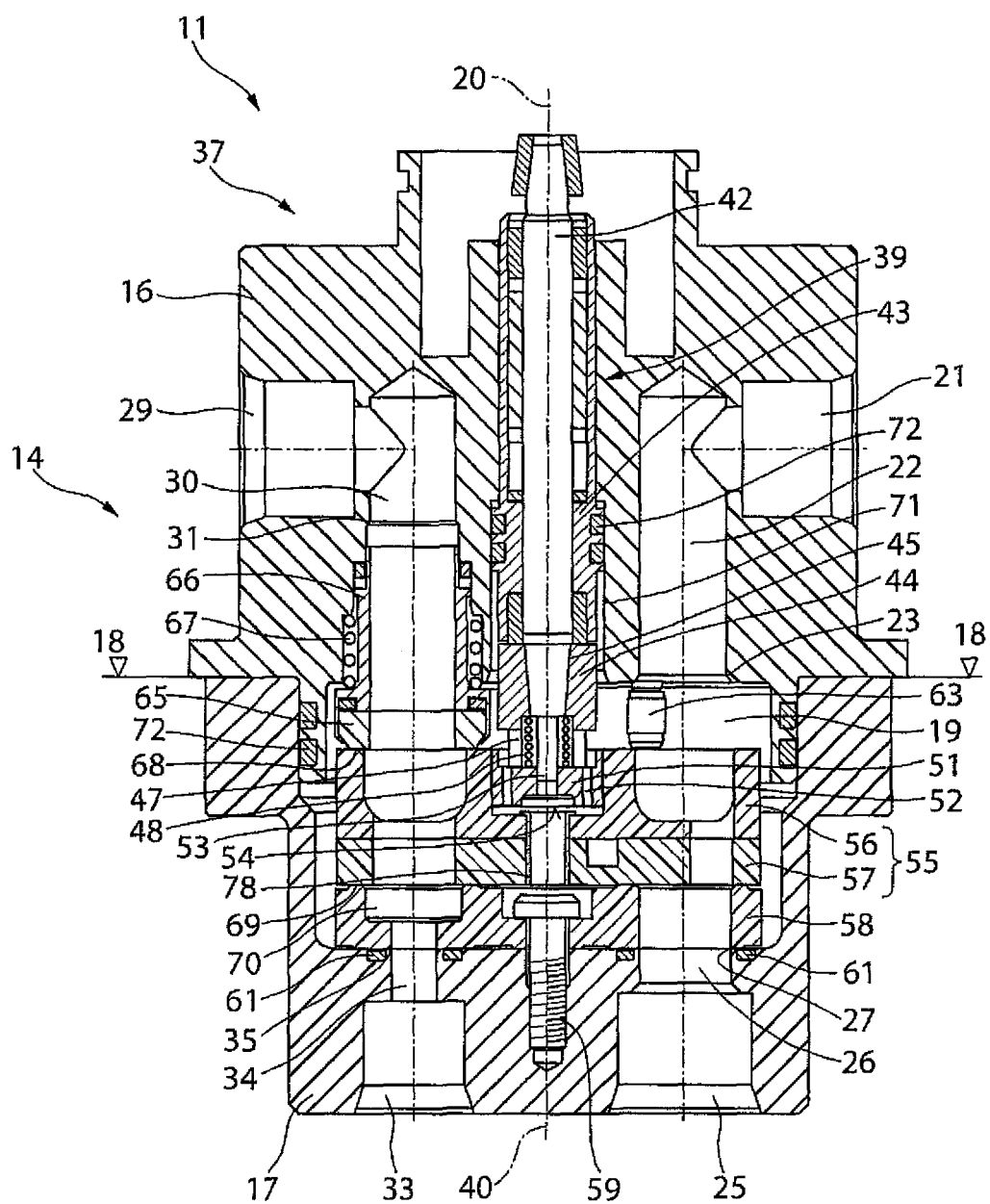
Figure 27:
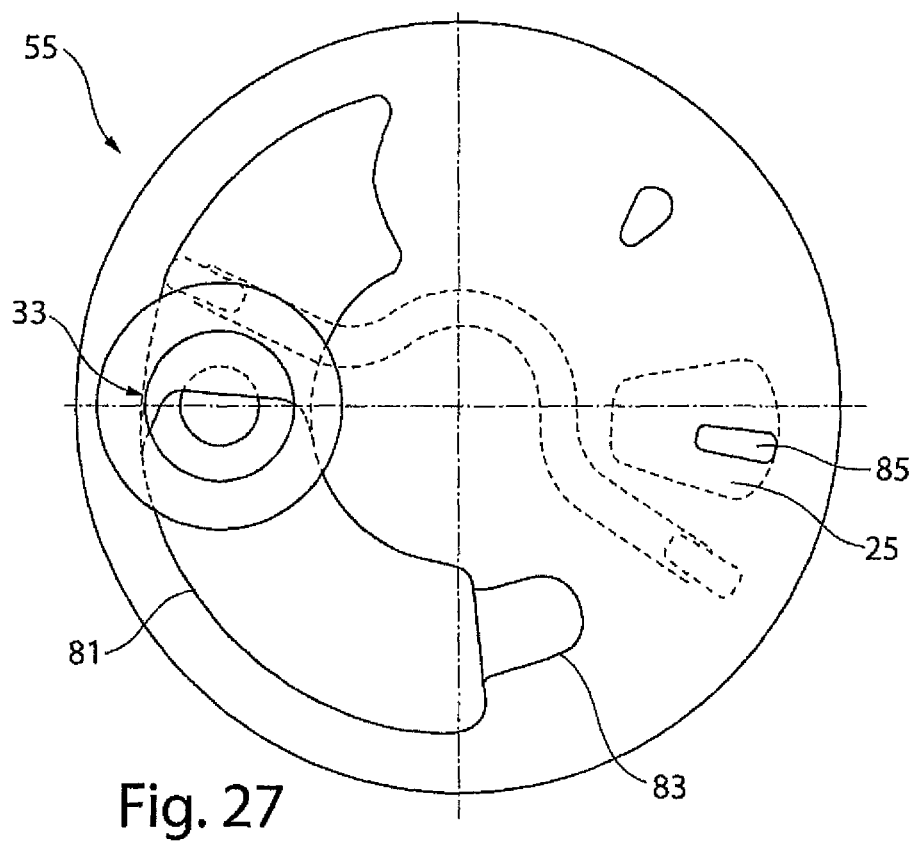
Figure 29A:
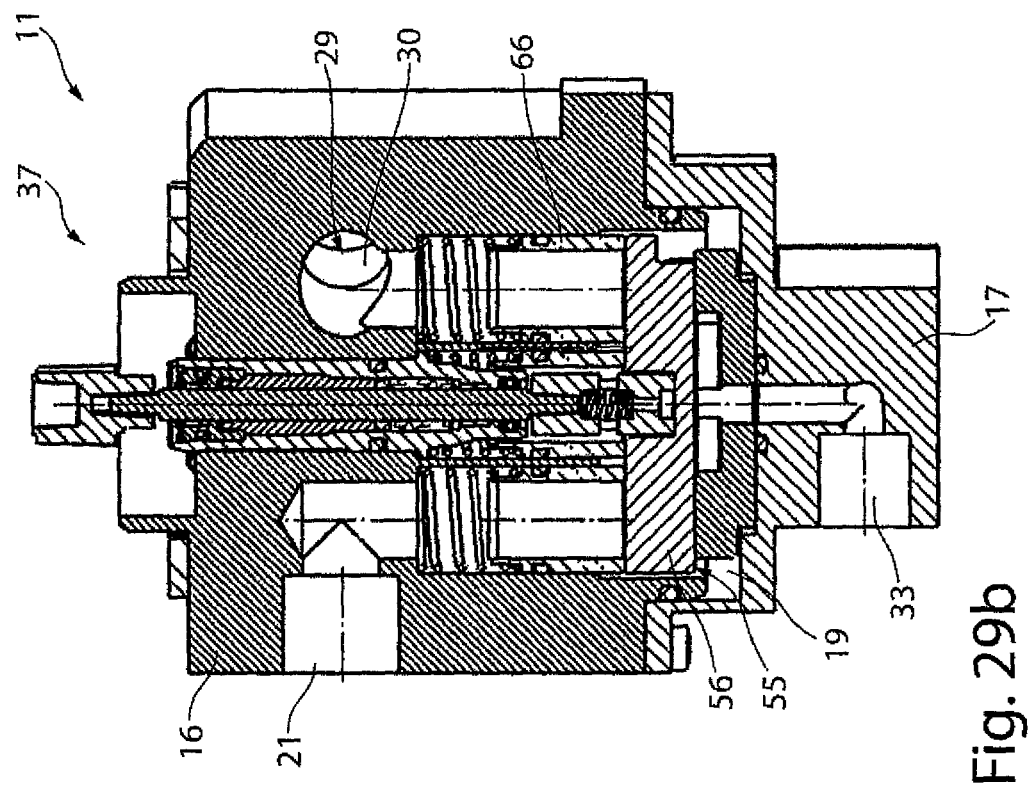
Figure 29B:
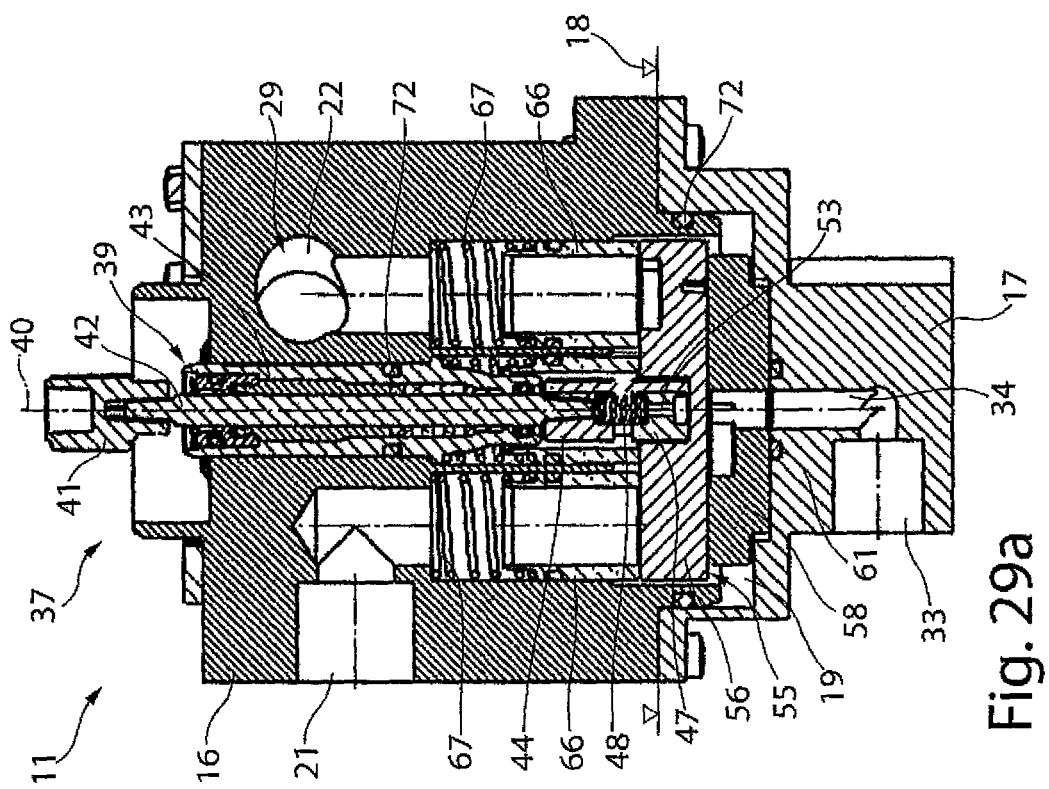
Figure 32B:
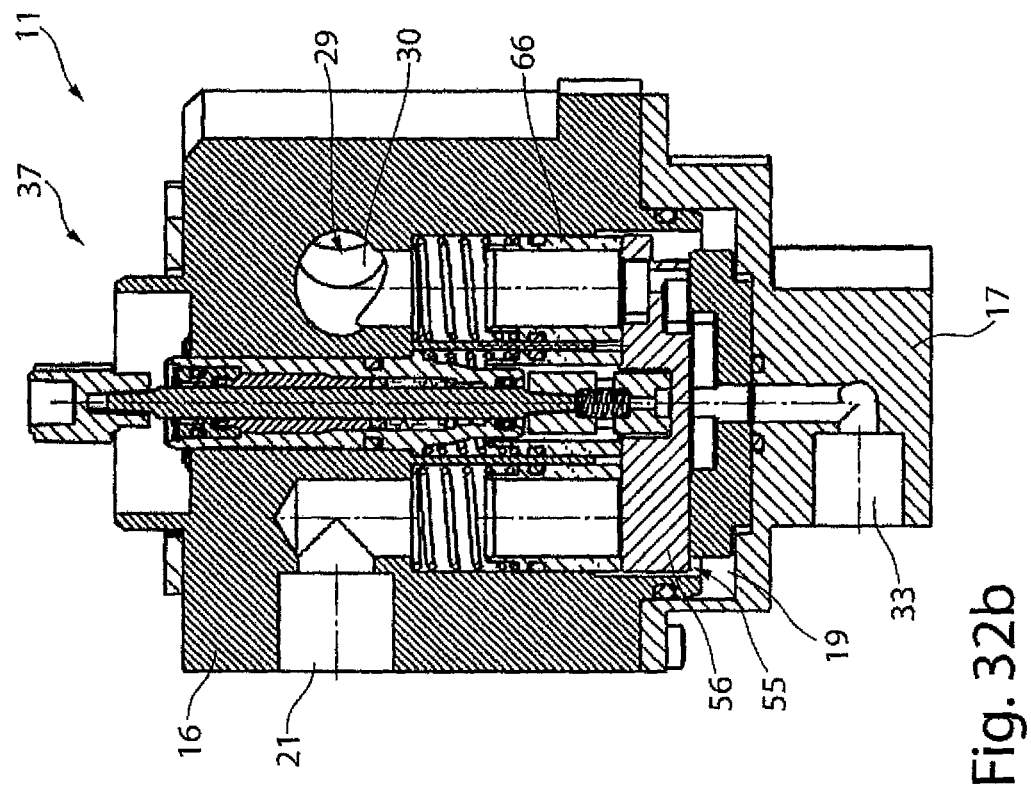
Figure 32A:
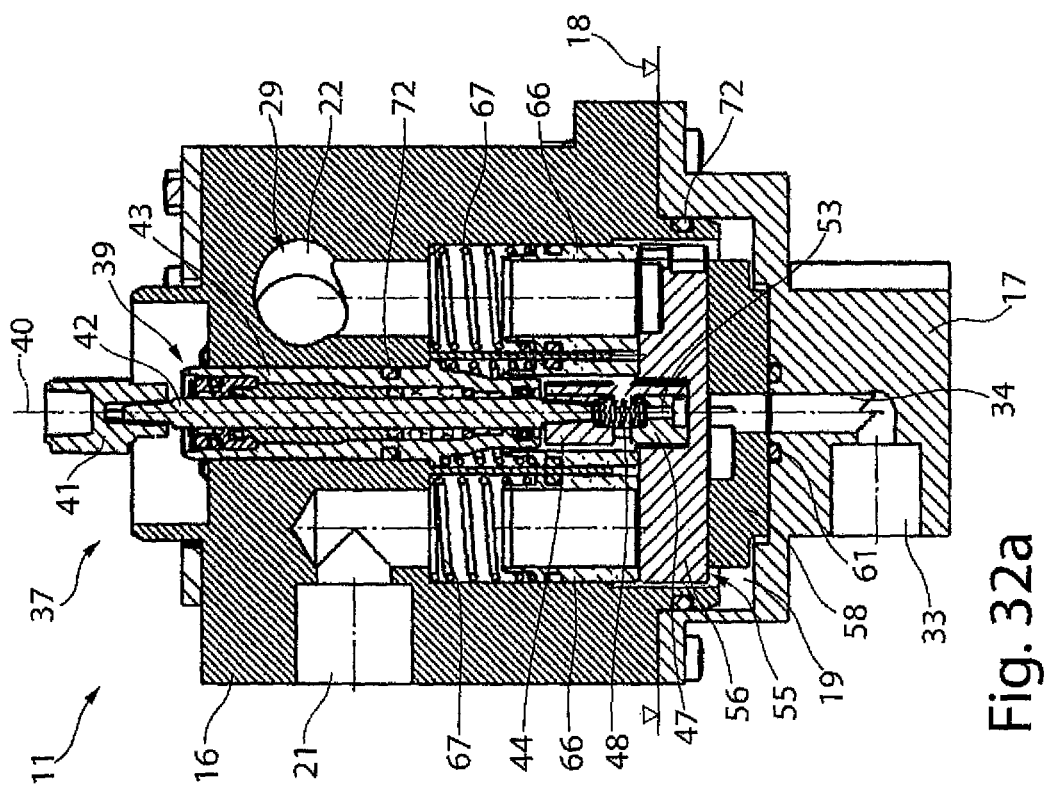
Figure 33B:
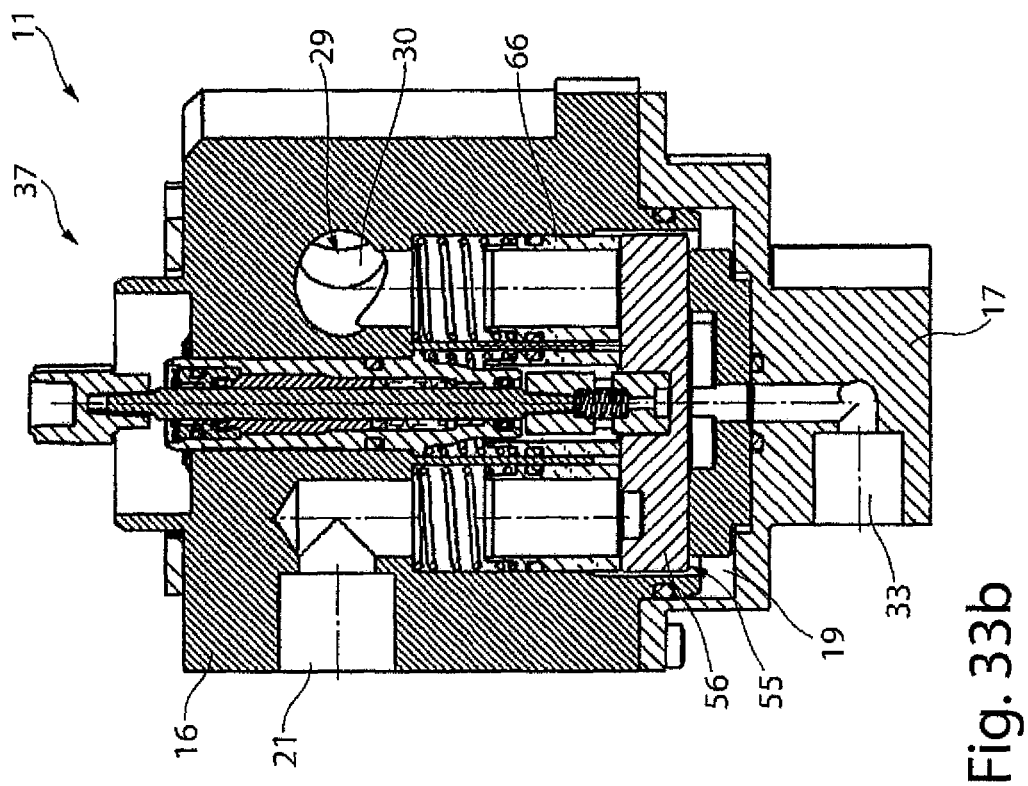
Figure 33A:
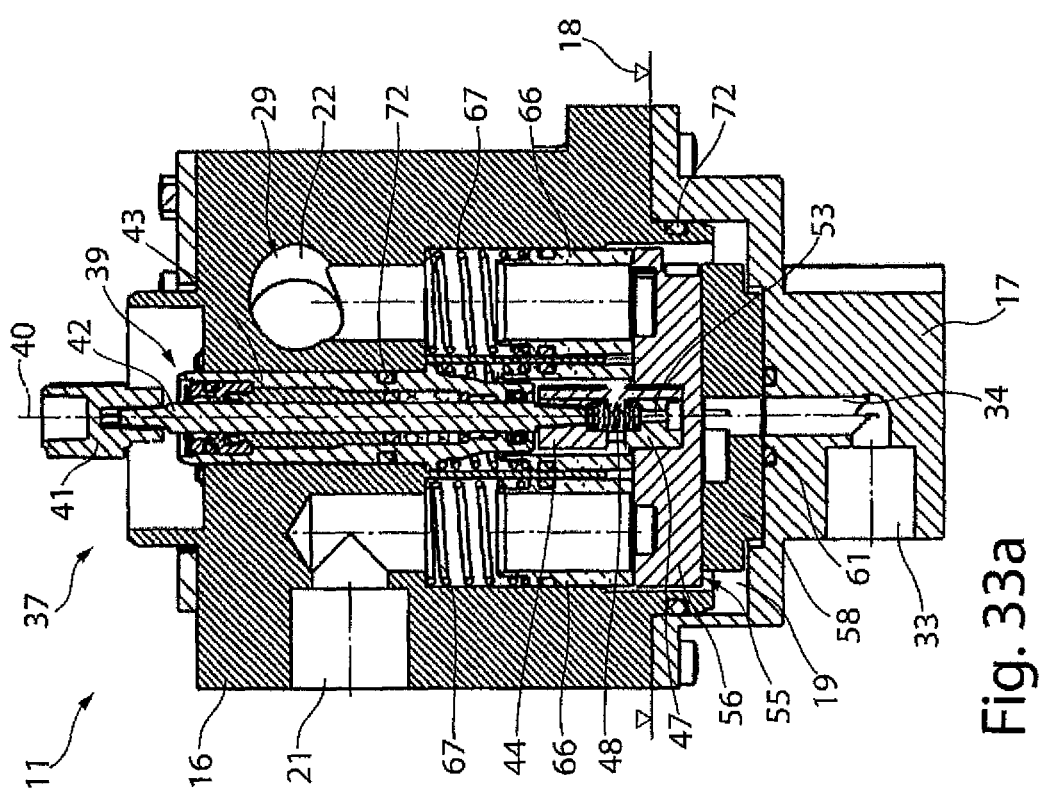
Figure 34B:
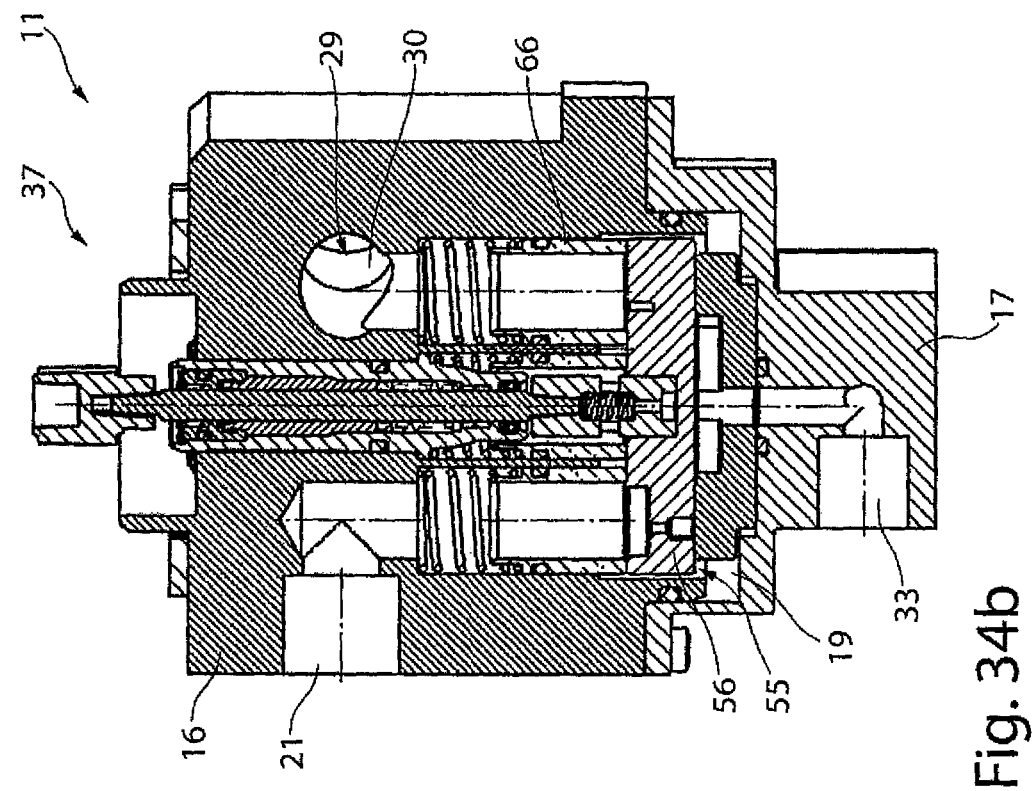
Figure 34A:
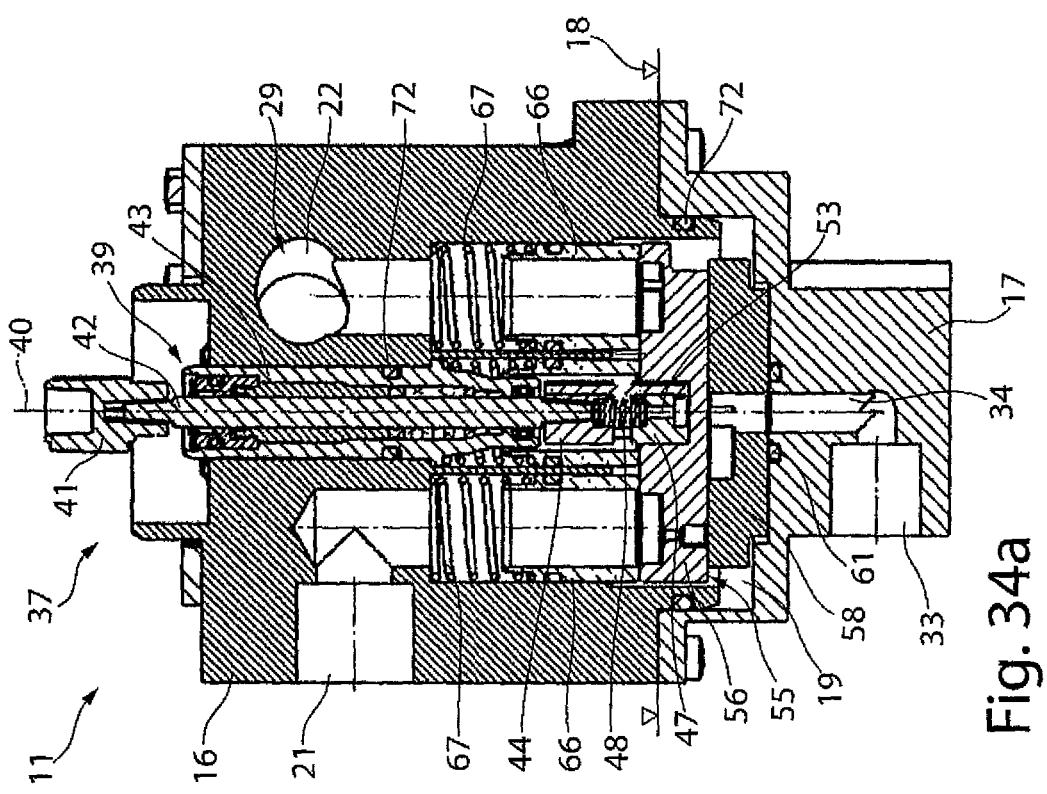

The invention as well as other advantageous embodiments and further developments of the same shall be described and explained in more detail in the following, with reference to the examples depicted in the drawings. The features to be deduced from the description and the drawings can be inventively applied either individually or in any combination, wherein:

FIG. 1 shows a schematic sectional view of a multiway valve,

FIG. 2 shows a perspective view of a rotary valve assembly having a transmission element, FIG. 3 shows a schematic sectional view of the intermediate adapter, FIG. 4 shows a schematic view from above of a first control disc of the rotary valve assembly, FIG. 5 shows a schematic view from above of a second control disc of the rotary valve assembly, FIG. 6 shows a perspective view of the rotary valve assembly, with apertures rendered visible, FIG. 7 shows a schematic sectional view of the multiway valve according to FIG. 1, in a switching position in the air conditioning mode, FIG. 8 shows a schematic arrangement of a refrigerant circuit, with a depiction of the switching position of the multiway valve according to FIG. 7, FIG. 9 shows a schematic view from above of the rotary valve assembly in a switching position of the multiway valve according to FIG. 7, FIG. 10 shows a schematic sectional view of the multiway valve in an air conditioning mode, FIG. 11 shows a schematic view of the refrigerant circuit, with a switching position of the multiway valve according to FIG. 10, FIG. 12 shows a schematic view from above of the rotary valve assembly in a switching position of the multiway valve according to FIG. 10, FIG. 13 shows a schematic sectional view of the multiway valve in a transition from the air conditioning mode to the heat pump mode, FIG. 14 shows a schematic view of the refrigerant circuit, with a switching position of the multiway valve according to FIG. 13, FIG. 15 shows a schematic view from above of the rotary valve assembly in a switching position of the multiway valve according to FIG. 13, FIG. 16 shows a schematic sectional view of the multiway valve in the heat pump mode, FIG. 17 shows a schematic view of the refrigerant circuit, with a switching position of the multiway valve according to FIG. 16, FIG. 18 shows a schematic view from above of the rotary valve assembly in a switching position of the multiway valve according to FIG. 16, FIG. 19 shows a schematic sectional view of the multiway valve [in a transition] from the heat pump mode into the air conditioning mode, FIG. 20 shows a schematic view of the refrigerant circuit with a switching position of the multiway valve according to FIG. 19, FIG. 21 shows a schematic view from above of the rotary valve assembly in a switching position of the multiway valve according to FIG. 19, FIG. 22 shows a schematic sectional view of the multiway valve in a flushing mode, FIG. 23 shows a schematic view of the refrigerant circuit with a switching position of the multiway valve according to FIG. 22, FIG. 24 shows a schematic view from above of the rotary valve assembly in a switching position of the multiway valve according to FIG. 22, FIG. 25 shows a schematic sectional view of the multiway valve in an evacuation and filling mode, FIG. 26 shows a schematic view of the refrigerant circuit with a switching position of the multiway valve according to FIG. 25, FIG. 27 shows a schematic view from above of the rotary valve assembly, in a switching position of the multiway valve according to FIG. 25, FIG. 28a, b show a first and a second sectional view of an alternative embodiment of the multiway valve according to FIG. 1 in a first switching position, FIG. 29a, b show a first and a second sectional view of the multiway valve according to FIG. 28 in a second switching position, FIG. 30a, b show a first and a second sectional view of the multiway valve according to FIG. 28 in a third switching position, FIG. 31a, b show a first and a second sectional view of the multiway valve according to FIG. 28 in a fourth switching position, FIG. 32a, b show a first and a second sectional view of the multiway valve according to FIG. 28 in a fifth switching position, FIG. 33a, b show a first and a second sectional view of the multiway valve according to FIG. 28 in a sixth switching position, and FIG. 34a, b show a first and a second sectional view of the multiway valve according to FIG. 28 in a seventh switching position.

A schematic sectional view of a multiway valve 11 is depicted in FIG. 1. Such a multiway valve 11 is used for controlling a refrigerant circuit 12 (FIG. 8) of an air conditioning system with heat pump function. This multiway valve 11 comprises a housing 14, which is advantageously composed of an upper housing part 16 and a lower housing part 17. A parting plane 18 between the upper and lower housing parts 17, 18 extends through a regulating chamber 19, which is composed of the inner chambers of both housing parts 16, 17. On the upper housing part 16, provision is made of an inlet opening 21, which ends via a first fluid channel 22 in an orifice 23 that is arranged on an upper side of the regulating chamber 19. A second connection opening 25 is connected on an opposing lower side of the regulating chamber 19. The connection opening 25 transitions to a second fluid channel 26, which ends in an orifice 27 on a lower side of the regulating chamber 19. The orifices 23, 27 are preferably aligned flush with one another.

On the upper housing part 16, provision is preferably made of a third connection opening 29 opposite the inlet opening 21, which transitions to a third fluid channel 30, which ends via an orifice 31 in the upper side of the regulating chamber 19. On the lower housing part 17, provision is made of an opposing fourth connection opening 33, which transitions to a fourth fluid channel 34 and ends in an orifice 35 on the lower side of the regulating chamber 19. This fourth fluid channel 34 preferably aligns with the third fluid channel 30.

The multiway valve 11 furthermore comprises an actuator 37, which comprises a drive motor 38 as well as a transmission element 39. This transmission element 39 advantageously extends completely through the upper housing part 16. The transmission element 39 connected for conjoint rotation with the drive motor 38 via a connection element 41. This connection element 41 can be made of plastic and has a cone-shaped receptacle so that after being plugged on, it is secured in a self-locking manner on a cone-shaped connection section of a shaft 42 of the transmission element 39, for conjoint rotation with. On the opposite end, the transmission element 39, in particular the shaft 42, protrudes into the regulating chamber 19. The shaft 42 is mounted in a shaft housing 43 in a rotatable and media-impermeable manner. On the end of the transmission element 39 directed toward the regulating chamber 19, provision is made of an intermediate adapter 44, which is coupled by a carrier 51 to the rotary drive of a rotary valve assembly 55. This rotary valve assembly 55 is provided in the regulating chamber 19.

The rotary valve assembly 55 comprises a first control disc 56, which is directed toward the upper housing part 16, and a second control disc 57, which is directed toward the lower housing part 17. The rotary valve assembly 55 is preferably rotatably mounted on a third control disc 58. The third control disc 58 is secured in a rotation-proof manner to the lower housing part 17 by means of a fastener 59, in particular a fastening screw. As an alternative, the third control disc 58 can also be integrated in or formed as a single piece with the other housing part 17, or the other housing part can comprise the function of the third control disc 58.

Between the third control disc 58 and a lower side of the regulating chamber 19, in each case provision is made of a gasket 61, preferably an O-ring, which surrounds the second orifice 27 and the fourth orifice 35 and seals these interfaces toward the regulating chamber 19.

The rotary valve assembly 55 is positioned under pressure in contact with the third control disc 58 by at least one hold-down device 63, in particular a pressure element, and by a spring-loaded sealing element 65. The pressure element 63 abuts on an upper side of the regulating chamber 19 on one hand and engages on an upper surface of the first control disc 56 on the other hand. The sealing element 65 is provided offset relative to the transmission element 39, in particular opposite the pressure element 63. This sealing element 65 comprises an O-ring, which is pressed onto the upper surface of the first control disc 56 by a spring-loaded clamping sleeve 66.

The clamping sleeve 66, with the sealing element 65 arranged thereon, rests with a low pressure surface 68 on the first control disc 56. A borehole diameter inside the sealing element 65 is preferably adapted to a diameter of a flow channel of the rotary valve assembly. If provision is not made of the third control disc 58, this applies similarly to an opening 70 directed toward the rotary valve assembly on the third control disc 58 or on a connection section of the housing. This opening 70 surrounds a low pressure surface 69, on which the second control disc 57 rests.

The opening inside the sealing element 65 and the opening 70 in the third control disc 58 are the same size or have approximately the same area. A tight fit of the second control disc 57 on the third control disc 58 is thus achievable in the set switching or control positions, even in the case of an acting high pressure.

For a tight fit of the sealing element 56 on the clamping sleeve 66, a suitable selection of an energy storage element 67 can be made in order to ensure the contact of the sealing element 65 on the low pressure surface 68.

The first and second control discs 56, 57, which can be rotatably driven by the transmission element 39 about a longitudinal axis 40 of the transmission element 39, as well as the third control disc 58 and the sealing element 65 are preferably made of the same material. In particular, a wear-resistant material such as a ceramic is used. This not only enables a sealing arrangement upon contact, but also results in little friction in the case of a relative movement between the parts.

The transmission element 39 is provided to a central housing borehole 71 in the upper housing part 16 through at least one sealing element 72, whereby the regulating chamber 19 is sealed with respect to a leakage point between the housing borehole 71 by the transmission element 39. Furthermore, at least one sealing element 72 is likewise preferably provided between the upper and lower housing parts 16, 17, in order to seal this interface.

As an alternative, provision can be made such that, for example, the third connection opening 29 described in the preceding is configured as an inlet opening, which is opposite the first inlet opening 21. The fourth outlet opening 33 plus the at least one second outlet opening 25 are then allocated to the regulating chamber as a result. In the embodiment depicted in FIG. 1, it is also possible to provide at least one second inlet opening, which preferably opens into the regulating chamber. As an alternative, provision can also be made of at least one additional outlet opening in the lower housing part 17 so that, for example, at least two outlet openings are allocated to each inlet opening. Provision can also be made for a further interchanging of outlet openings with inlet openings or of inlet openings with outlet openings. This is brought about by appropriately connecting the connection lines to the respective openings for supplying the volume flow.

However, provision is preferably made such that the flow direction in the case of several inlet openings is oriented in such a way that the first and the second control discs 56, 57 are pressed together by the pressure prevailing in the regulating chamber in all operating states so as to ensure that the channels and/or openings formed in the first and the second control discs 56, 57 are mutually sealed.

A pressure-loaded area A is formed between the rotary valve assembly 55, particularly the first control disc 56, and a sealing element 65 arranged on the clamping sleeve 66. This pressurized area A is delimited by the outer circumference of a sealing geometry of the sealing element 65 to the first control disc 56. This pressure-loaded area A thus comprises the low pressure surface 68 as well as the size of the borehole inside the sealing element 65.

Oppositely, a pressure-loaded area B is formed between the rotary valve assembly 55, particularly the second control disc 57, and the third control disc 58. The pressure-loaded area B of the third control disc 58 is delimited by the outer circumference of the low pressure surface 69, which surrounds the opening 70 in the third control disc 58. The pressure-loaded area B is thus formed by the low pressure surface 69 and the area of the opening 70 situated within the low pressure surface 69.

The ratio of the pressure-loaded area A to the pressure-loaded area B is preferably between 0.25 and 2. The pressure-loaded area A and the pressure-loaded area B are in particular equal in area. This permits a sealed arrangement in the transition zone from the regulating chamber to the respective adjoining connection openings, in particular the third connection opening 29 and the fourth connection opening 33.

The rotary valve assembly 55 as well as the intermediate adapter 44 engaging thereon and a shaft 42 of the transmission element 39 are illustrated in perspective in FIG. 2. FIG. 3 shows a schematically enlarged view of the intermediate adapter 44 with the relevant coupling point. The intermediate adapter 44 is preferably configured as a coupler for a tolerance and/or position correction. The intermediate adapter 44 is ring-like and has a truncated cone-like inner contour, which is connected to a likewise truncated cone-like clamping surface 45 of a rotatably driven shaft 42, for conjoint rotation therewith (FIG. 2). The intermediate adapter 44 comprises carrier elements 47 directed toward the carrier 51, which are preferably configured as spring bolts that are uniformly distributed over the circumference. These carrier elements 47 engage in complementary carrier elements 52, particularly in boreholes of the carrier 51. An energy storage element 48, particularly a compression spring, is provided between the intermediate adapter 44 and the carrier 51, whereby the carrier 51 is received in an axially displaceable manner with respect to the intermediate adapter 44. The carrier 51 is preferably inserted in an open-edge receptacle 76 of the first control disc 56. This receptacle 76 is preferably polygonal, in particular hexagonal. The carrier 51 has a similar contour on its outer periphery, whereby a rotationally secured assembly is formed between the carrier 51 and the first control disc 56.

A correction can be effected by the carrier elements 47 in the event of an axial offset between the rotary valve assembly 55 and the intermediate adapter 44 or the shaft 42 of the transmission element 39. However, it is still ensured that a rotary motion of the shaft 42 can be transmitted via the intermediate adapter 44 and via the rotary coupling to the carrier 51. Owing to the design of the intermediate adapter 44 having the carrier elements 47 and with the carrier 51 having the complementary carrier elements 52, a rotational coupling is created that enables a lateral offset as well as a change of the distance in the longitudinal axis 40 with respect to one another.

A view from above of the control disc 56 is depicted in FIG. 4. In its center, this control disc 56 receives the carrier 51, which can be inserted in the receptacle 76. A first aperture 81 extends on a circumference around the rotation axis or longitudinal axis 40. This aperture is arc segment-shaped and extends, for example, in a 90° circumferential angle. A trough-shaped recess 82 adjoins the first aperture 81, at one end thereof. This recess is recessed with respect to an upper surface of the first control disc 56. This trough-shaped recess 82 preferably extends in an angular zone of an additional 90° or slightly less. On the arc segment-shaped first aperture 81 of the first control disc 56, another recess 83 extends in the opposite direction to the trough-shaped recess 82. A second aperture 84 is provided opposite the first aperture 81. This second aperture is preferably drop-shaped and tapers toward the longitudinal axis 40. In addition a third aperture 85 is provided, which is preferably bar-shaped. Another borehole 89 serves as a receptacle for an anti-rotation lock, which extends into the same aperture 86 on the second control disc 57. As a result, the first control disc 56 and the second control disc 57 are fixedly aligned with one another with respect to the radial alignment of the apertures 81, 84, 85.

A view from above of the second control disc 57 is depicted in FIG. 5. After being brought together with the first control disc 56, this depicted upper surface rests on a lower surface of the first control disc 56. Analogously configured, this second control disc 57 has the first aperture 81, the second aperture 84, and the third aperture 85 as well as the borehole 86. As a result, the first, second, and third apertures 81, 84, and 85 extend completely through both control discs 56, 57 and form an axial throughflow channel in each case.

On an upper surface, the second control disc 56 furthermore has an open-edge channel 88. This channel 88 ends in each case in an opening 89, which extends to the lower surface of the control disc 56. This opening 89 is preferably bar-shaped.

After the first and the second control disc 57 are brought together, this channel 88 is closed by the lower surface of the first control disc 56. As a result, a throughflow along the channel 88, starting from the upper surface of the first control disc 56 and the lower surface of the second control disc 57, is not possible.

The rotary valve assembly 55 is depicted in perspective in FIG. 6. The corresponding apertures 81, 84, 85 as well as the borehole 86 and the channel 88 with its openings 89 are represented with dashed lines.

A transitional switching position is schematically illustrated in FIG. 7, wherein the rotary valve assembly is positioned in such a way that the inlet opening 21 and the first connection opening 25 are interconnected, and the third connection opening 29 is also connected to the fourth connection opening 33. As a result of this circuit arrangement according to FIG. 7, which is symbolically represented in the refrigerant circuit 12 in FIG. 8, the refrigerant circuit 12 is in the air conditioning mode, wherein a suction from a low pressure heat exchanger is enabled. This refrigerant circuit 12 is a circuit that is illustrated as an example. Described in the flow direction, this refrigerant circuit 12 comprises a condenser 91, which supplies the refrigerant under high pressure to an expansion valve 92. An evaporator 93 is provided on the low pressure side of the expansion valve 92, which supplies the de-pressurized refrigerant to a compressor 94. A fluid line 95 is provided on the outlet side of the compressor 94, which leads directly to the inlet opening 21 of the multiway valve 11. A branch fluid line 96 is provided upstream of this inlet opening 21, which leads to the third outlet opening 29 or opens into the fluid line 97 leading to the condenser 91.

Another fluid line 98, which opens into the fluid line 97, is hooked up to the second connection opening 25 of the multiway valve 11. The fourth connection opening 34 of the multiway valve 11 is connected to another fluid line 99, which opens a direct return of the fluid into the first fluid line 95 leading to the compressor 94, and does so before the inlet into the compressor 94. For controlling and regulating the individual fluid lines 96, 98, and 99, provision can be made of regulating valves 101, which can be actuated with respect to the flow direction and/or the amount of the flow volume.

Another bypass line 102 leading directly to the fluid line 98 can be allocated to the branch fluid line 96, in opposition thereto. Another regulating valve 101 can preferably be provided in this bypass line 102.

The switching position of the multiway valve 11 depicted in FIG. 7 is shown in a view from above in FIG. 9, after removal of the upper housing part 16. The positioning of the rotary valve assembly 55 relative to the orifices 25, 33 or fluid channels 26, 34 is illustrated in this view from above. The first aperture 81 of the rotary valve assembly 55 is positioned in the regulating chamber 19 in such a way as to give rise to a direct passage between the inlet opening 21 and the fluid channel 22 as well as between the fluid channel 26 and the second connection opening 25. Such a passage is furthermore provided between the third connection opening 29 toward the fourth connection opening 33. As a result of the design of the rotary valve assembly 55, other flow-through paths are blocked; in other words the refrigerant is prevented from flowing from the inlet opening 21 to the third and fourth connection openings 29, 33.

This first switching position of the rotary valve assembly 55 depicted in FIG. 8 can actuate, for example, an air conditioning mode with a simultaneous suction of a circuit.

The rotary valve assembly 55 according to the illustration in FIG. 10 is then brought by another rotary motion into a position in which the refrigerant flows from the inlet opening 21 to the second connection opening 25 and in which the third and fourth connection openings 29, 33 are closed. This is shown in the schematic illustration of the refrigerant circuit 12 in FIG. 11.

FIG. 12 shows a schematic top view of the rotary valve assembly in relation to the orifices 25, 33 according to the switching position in FIG. 10.

This second switching position of the rotary valve assembly 55 can actuate purely an air conditioning mode.

For switching the refrigerant circuit 12 according to FIG. 11 into a heat pump mode, the rotary valve assembly 55 is first brought into a position according to FIG. 13, in which the refrigerant continues to flow from the inlet opening 21 to the second connection opening 25 and in which the refrigerant is additionally conducted from the inlet opening 21 to the third connection opening 29. The fourth connection opening 33 is closed. Because the compressor is still running, the inlet opening 21 must not be closed, hence there is a splitting-off of the refrigerant flow in this transition phase. The switching position of the multiway valve 11 is schematically illustrated in FIG. 14.

The switching position of the rotary valve assembly 55 is in turn shown in a top view according to FIG. 15.

A transition from an air conditioning mode into a heat pump mode can be actuated in a third switching position of the rotary valve assembly 55 according to FIGS. 13 through 15.

In FIG. 16, the rotary valve assembly 55 in the multiway valve 11 is arranged in another switching position. The inlet opening 21 is connected to the third connection opening 29. The second and fourth connection openings 25, 33 are closed. The rotary valve assembly 55 is thus provided in a position in which the recesses 82, the first aperture 81, and the recess 83 are positioned between the two orifices 27 and 35 so as to effect the rerouting. The switching arrangement associated therewith is schematically illustrated in FIG. 17.

The switching position of the rotary valve assembly 55 is in turn shown in a top view according to FIG. 18.

In a fourth switching position of the rotary valve assembly 55 according to FIGS. 16 through 18, it is possible to actuate purely a heat pump mode, in other words effect a heating of a circuit.

In the case of another switchover into the heat pump mode, the rotary valve assembly 55 is brought into a rotary position according to FIG. 19, in which the refrigerant is conveyed from the inlet opening 21 into the third connection opening 29 and the channel 88 is simultaneously activated so as to enable a bypass flow from the second connection opening 25 into the fourth connection opening 33.

The refrigerant circuit associated therewith is illustrated in FIG. 20. FIG. 21 shows the positioning of the rotary valve assembly 55 according to FIG. 19.

In a fifth switching position of the rotary valve assembly 55 according to FIGS. 19 through 21, it is possible to actuate a heat pump mode, particularly a heating with simultaneous suction of the air conditioning circuit.

A further rotary motion of the rotary valve assembly 55 can then take place in order to assume the switching position according to FIG. 22 and/or FIG. 23.

A view from above of the rotary valve assembly 55 in the switching position according to FIG. 22 is in turn depicted in FIG. 24.

The circuits can be flushed in a sixth switching position of the rotary valve assembly 55.

These switching positions make it possible to flush and evacuate the refrigerant circuit. For flushing, the valve assembly 55 is positioned in such a way that the refrigerant runs from the inlet opening 21 into the third connection opening 29 and into the fourth connection opening 33.

In FIG. 25, the rotary valve assembly 55 is depicted in a switching position in which an evacuation of the refrigerant circuit 12 and a subsequent filling thereof are enabled. In this process, the rotary valve assembly 55 unblocks a passage from the inlet opening 21 to the first, second, third, and fourth connection openings 25, 29, 33. This switching position is illustrated schematically in FIG. 26.

FIG. 27 in turn shows the switching position of the valve assembly according to FIG. 25, in a view from above.

In a seventh switching position, the rotary valve assembly 55 can be brought into a switching position that enables a filling and evacuation of the refrigerant circuit.

A first sectional view of an alternative embodiment of the multiway valve 11 of FIG. 1 is illustrated in FIG. 28a. The sectional view according to FIG. 28a comprises a cutting line running from a first inlet opening 21 to the central longitudinal axis 40 and then to a second connection opening 25 in the upper housing part 16, wherein the section lines form a 120° angle. FIG. 28b shows another sectional view of the alternative embodiment of the multiway valve 11 of FIG. 1. The section line in FIG. 28b runs from the inlet opening 21 at a 240° angle, hence a third connection opening 29 in the upper housing part 16 is visible in this sectional view.

In this embodiment in FIG. 28, the upper housing part 16 of the multiway valve 11 has three connections, namely the inlet opening 21, the second connection opening 25, and the third connection opening 29, which are arranged mutually offset by 120°, respectively. As an alternative, the angular arrangements between the individual openings can also deviate from one another.

The fourth connection opening 33 is provided in the lower housing part 11 of this alternative embodiment. As a consequence, this alternative embodiment of the multiway valve 11 deviates in the number of openings with respect to the upper housing part 16 and the lower housing part 17.

Provision can also be made for an interchanging according to the number of openings in the upper and lower housing parts 16, 17 illustrated in FIGS. 28a, b.

A further optional deviation of the multiway valve 11 according to FIGS. 28a and b with respect to the embodiment in FIG. 1 is such that the rotary valve assembly 55 is formed from only one control disc, the first control disc 56. The latter is supported on the third control disc 58. The surfaces of the first control disc 56 or any of the connection surfaces or low pressure surfaces 68, 69 that are provided in the embodiment described in the preceding can also be provided in this embodiment.

The arrangement of the clamping sleeve 66 in the second contact opening 29 according to the embodiment in FIG. 1 can be provided in the inlet opening 21 as well as in the second and/or third contact opening(s) 25, 29 in the case of the embodiment according to FIGS. 28a and b. This clamping sleeve 66 can comprise a sealing element 65. As an alternative, the clamping sleeve 66 can have a sealing surface formed directly thereon, which rests on an outer surface of the first control disc 56 in a sliding and sealing manner.

The rotary valve assembly 55 in FIG. 28 is positioned in a first switching position, which corresponds to the first switching position in FIG. 8.

The other FIGS. 29 through 34 also show a first sectional view in analogy to FIG. 28a and a second sectional view in analogy to FIG. 28b. In the respective following FIGS. 29-34, the switching position of the rotary valve assembly 55 differs in each case.

In FIGS. 29a and b, the rotary valve assembly 55 is depicted in a second switching position that corresponds to the switching position in FIG. 11.

In FIGS. 30a and b, the rotary valve assembly 55 is positioned in a third switching position that corresponds to the one in FIG. 14.

In FIGS. 31a and b, the rotary valve assembly 55 is positioned in a fourth switching position that corresponds to the switching position of the multiway valve in FIG. 17.

In FIGS. 32a and b, the rotary valve assembly 55 is in the fifth switching position in analogy to FIG. 20.

In FIGS. 33a and b, the rotary valve assembly 55 of the multiway valve 11 is in a sixth switching position corresponding to FIG. 23.

In FIGS. 34a and b, the rotary valve assembly 55 of the multiway valve 11 is arranged in a seventh switching position, which corresponds to the switching position of the multiway valve illustrated in FIG. 26.

In terms of the other design features and embodiments for the second alternative embodiment according to FIGS. 28a-34b, reference is made in entirety to the statements regarding the first embodiment of the multiway valve according to FIGS. 1-27.

The invention claimed is:

1. A multiway valve for controlling a refrigerant circuit of an air conditioning system with heat pump function,
   having a housing,
   having a first inlet opening, which is connected by a first fluid channel to a regulating chamber in the housing,
   having a second connection opening, which is connected by a second fluid channel to the regulating chamber,
   having at least one other connection opening, which is connected by at least one other fluid channel to the regulating chamber, having an actuator, which drives, by a drive motor, a transmission element that extends in the housing between the drive motor and the regulating chamber, and having a rotary valve assembly arranged in the regulating chamber, which is coupled to the transmission element and which is driven by a rotary motion of the transmission element about its longitudinal axis into several consecutive and divergent switching or control positions between the inlet opening and the connection openings, wherein the rotary valve assembly is formed from a control disc or that the rotary valve assembly is composed of at least a first and a second control disc, which are rigidly interconnected and which are driven about the longitudinal axis by a rotary motion of the transmission element, wherein a pressure-loaded area of the sealing element, which is delimited by the outer circumference of a sealing geometry of the sealing element relative to the first control disc and that a pressure-loaded area of the third control disc, which is delimited by the outer circumference of a low pressure surface surrounding the opening of the third control disc, are in a ratio of between 0.25 and 2.

2. The multiway valve according to claim 1, wherein the rotary valve assembly at least comprises a first switching or control position for actuating a first operation mode, which connects the inlet opening to the second connection opening and mutually bypasses a third and fourth connection openings and closes them with respect to the inlet opening and to the second connection opening, or a second switching or control position for actuating another operation mode, which connects the inlet opening to the second connection opening and closes the third and fourth connection openings in each case, or a third switching or control position for actuating another operation mode, which connects the inlet opening to the second connection opening and to the third connection opening and closes the fourth connection opening, or a fourth switching or control position for actuating another operation mode, which connects the inlet opening to the third connection opening and closes the second and fourth connection openings in each case, or a fifth switching position for actuating another operation mode, which connects the inlet opening to the third connection opening and bypasses the second connection opening with the fourth connection opening, or a sixth switching or control position for actuating another operation mode, which connects the inlet opening to the third connection opening and to the fourth connection opening and closes the second connection opening, or a seventh switching or control position for actuating another operation mode, which connects the inlet opening to the second connection opening, to the third connection opening, and to the fourth connection opening.

3. The multiway valve according to claim 2, wherein provision is made for any switchover between the switching positions and that at least one outlet opening is open and that in all switching positions, a connection between the inlet opening and the fourth connection opening is blocked.

4. The multiway valve according to claim 1, wherein provision is made in the housing of at least one other inlet opening, which are driven by the rotary valve assembly into different switching and control positions with the at least a first inlet opening and/or with the connection openings.

5. The multiway valve according to claim 1, wherein the housing is formed of two parts and comprises an upper and a lower housing part, wherein a parting plane lies in the regulating chamber between the upper and the lower housing part.

6. The multiway valve according to claim 1, wherein the first and the second control disc of the rotary valve assembly have apertures arranged separated from one another, which are aligned flush with one another and lie on a common circumference.

7. The multiway valve according to claim 6, wherein the first aperture of the control disc is arc segment-shaped and extends along a circumferential angle of at least 90° and that a second aperture is drop-shaped and that a third through-bore is bar-shaped.

8. The multiway valve according to claim 6, wherein on the first control disc, a trough-shaped recess adjoins one end of a first aperture, which is provided opposite the second control disc, and another recess is provided at the other end of the first aperture, and the first aperture with the recesses extending on both sides thereof form a 180° circumferential angle.

9. The multiway valve according to claim 6, wherein the second control disc has a channel open at the edge to the first control disc, wherein at each of its ends the channel comprises an opening directed to the lower surface of the second control disc, and that the open channel is sealed or closed by the first control disc and that the openings lie on a circumference of the apertures.

10. The multiway valve according to claim 1, wherein a third control disc, which is arranged on the lower housing part, is provided on the bottom side of the regulating chamber.

11. The multiway valve according to claim 10, wherein provision is made of at least one hold-down device between an upper side of the regulating chamber and an opposing upper surface of the first control disc, by which the rotary valve assembly is mounted sealingly against the third control disc.

12. The multiway valve according to claims 10, wherein a seal is provided in each case between the third control disc and an orifice on the lower housing part and that another sealing element is provided between the first control disc and the orifice on the upper housing part.

13. The multiway valve according to claims 1, wherein the control discs are made of a wear-resistant and/or low-friction ceramic or plastic.

14. The multiway valve according to claim 1, wherein the rotary valve assembly is composed of at least a first and a second control disc, which are sintered or baked together or configured as a 3D load bearing component.

15. The multiway valve according to claim 1, wherein the first control disc of the rotary valve assembly, which points to the transmission element, receives a carrier that is inserted in an open-edge cut-out of the first control disc.

16. The multiway valve according to claim 15, wherein the carrier and a shaft are coupled to one another by an intermediate adapter and that the intermediate adapter is attached to the transmission element by clamping or tensioning.

17. The multiway valve according to claim 16, wherein the intermediate adapter is slidable in an axial direction to the carrier.

18. The multiway valve according to one of claim 16, wherein the intermediate adapter and the carrier are configured as a bolt coupling and that the intermediate adapter has at least one carrier element, said at least one carrier element is connected to at least one complementary carrier element of the carrier and engages in a bore hole on the carrier.

19. The multiway valve according to claim 18, wherein provision is made of at least one carrier element configured as a bolt and one complementary carrier element configured as a borehole, which are displaceably guided together in an axial direction.

20. The multiway valve according to claim 1, wherein the drive motor actuates the transmission element that is sealed in a gas-tight manner from the atmosphere.

21. The multiway valve according to claim 1, wherein the refrigerant is supplied to the regulating chamber via the inlet opening independently of switching positions of the rotary valve assembly.

* * * * *